("12") United States Patent
Hatfield et al.

(10) Patent No.: US 11,408,232 B2
(45) Date of Patent: Aug. 9, 2022

(54) SKID ASSEMBLY FOR TRANSPORTING, INSTALLING AND REMOVING BLOWOUT PREVENTERS

(71) Applicants: Jason A Hatfield, Marshallville, OH (US); James R Poulson, Beach City, OH (US)

(72) Inventors: Jason A Hatfield, Marshallville, OH (US); James R Poulson, Beach City, OH (US)

( * ) Notice: Subject to any disclaimer, the term of this patent is extended or adjusted under 35 U.S.C. 154(b) by 0 days.

(21) Appl. No.: 15/906,222

(22) Filed: Feb. 27, 2018

(65) Prior Publication Data
US 2018/0238118 A1  Aug. 23, 2018

Related U.S. Application Data

(63) Continuation-in-part of application No. 29/620,565, filed on Feb. 23, 2017, now Pat. No. Des. 827,972.
(Continued)

(51) Int. Cl.
*E21B 15/00* (2006.01)
*E21B 33/06* (2006.01)
(Continued)

(52) U.S. Cl.
CPC .......... *E21B 15/003* (2013.01); *E21B 19/00* (2013.01); *E21B 33/06* (2013.01); *E21B 7/02* (2013.01);
(Continued)

(58) Field of Classification Search
CPC ........ E21B 19/00; E21B 15/003; E21B 33/06; E21B 7/02
See application file for complete search history.

(56) References Cited

U.S. PATENT DOCUMENTS

D8,759 S     10/1875   Capron ......................... D20/17
D19,202 S    7/1889    Perkins ......................... D8/313
(Continued)

OTHER PUBLICATIONS

ALE Transformer Transportation and Skidding, posted at youtube. com, posting date May 15, 2012, [online], [site visited May 6, 2018]. Available from Internet, URL: https://www.youtube.com/watch?v=LS02Mwrhsmo (Year: 2012).
(Continued)

*Primary Examiner* — Jonathan Malikasim
(74) *Attorney, Agent, or Firm* — David A. Burge; Benjamin D. Burge

(57) ABSTRACT

A skid assembly includes a base assembly and a slide assembly, each having a first end and a second end, wherein: the slide assembly comprises a first support station toward the first end and a second support station toward the second; each support station is configured to support a separate component of a BOP assembly; and the slide assembly is movable between a retracted position in which the first and second ends of the slide assembly overlie the first and second ends, respectively, of the base assembly, and an extended position in which the first end of the slide assembly extends beyond the first end of the base assembly to position the first support station, with the BOP assembly assembled thereon, directly over a well head located within a cellar at a well site with the base assembly supported atop a ground surface adjacent to an edge of the cellar.

16 Claims, 19 Drawing Sheets

Related U.S. Application Data

(60) Provisional application No. 62/600,741, filed on Feb. 28, 2017.

(51) Int. Cl.
  *E21B 19/00* (2006.01)
  *E21B 7/02* (2006.01)
  *F16M 3/00* (2006.01)
  *F16M 1/00* (2006.01)
  *F16M 11/42* (2006.01)

(52) U.S. Cl.
  CPC .............. *F16M 1/00* (2013.01); *F16M 3/00* (2013.01); *F16M 11/42* (2013.01); *F16M 2200/025* (2013.01)

(56) References Cited

U.S. PATENT DOCUMENTS

| | | | | |
|---|---|---|---|---|
| D106,684 S | 10/1937 | Frankel | | D8/400 |
| D115,712 S | 7/1939 | Kersting | | D8/360 |
| D152,936 S | 3/1949 | Bloom | | D8/353 |
| 2,836,277 A | 5/1958 | Stuart | | B65G 69/287 |
| | | | | 193/41 |
| D185,144 S | 5/1959 | Flynn | | D8/339 |
| 3,498,375 A * | 3/1970 | Donnally | | E21B 33/064 |
| | | | | 166/79.1 |
| 4,007,782 A | 2/1977 | Nybo et al. | | 166/79 |
| 4,125,164 A | 11/1978 | Terry | | 166/315 |
| 4,230,190 A | 10/1980 | Guinn et al. | | 175/5 |
| 4,305,467 A | 12/1981 | Villines | | 166/385 |
| D264,177 S | 5/1982 | Cole | | D8/336 |
| 4,359,089 A * | 11/1982 | Strate | | E21B 33/06 |
| | | | | 166/383 |
| D268,895 S | 5/1983 | Beleckis | | D8/356 |
| D278,944 S | 5/1985 | Bresie | | D34/28 |
| D365,135 S | 12/1995 | Elliott | | D22/121 |
| D383,057 S | 9/1997 | Davies | | D8/400 |
| D385,176 S | 10/1997 | Mandell | | D8/341 |
| 5,816,565 A | 10/1998 | McGuffin | | 254/386 |
| D409,079 S | 5/1999 | Sobczynski | | D8/354 |
| 5,957,431 A | 9/1999 | Serda, Jr. | | 254/285 |
| 6,053,255 A | 4/2000 | Crain | | E21B 19/02 |
| D459,050 S | 6/2002 | Meyer | | D34/38 |
| 6,494,268 B1 | 12/2002 | Ljungdahl et al. | | E21B 19/00 |
| 6,763,890 B2 * | 7/2004 | Polsky | | E21B 15/003 |
| | | | | 166/360 |
| 6,902,007 B1 * | 6/2005 | Orr | | E21B 19/00 |
| | | | | 166/379 |
| 6,955,223 B2 | 10/2005 | Orr et al. | | E21B 19/00 |
| 7,040,411 B2 | 5/2006 | Kainer et al. | | E21B 19/24 |
| 7,086,474 B1 * | 8/2006 | Trevithick | | E21B 19/00 |
| | | | | 166/379 |
| 7,389,820 B2 * | 6/2008 | Day | | E21B 15/045 |
| | | | | 166/379 |
| D590,573 S | 4/2009 | Hermans | | D34/38 |
| D600,874 S | 9/2009 | Hermans | | D34/38 |
| D608,181 S | 1/2010 | Koizumi | | D8/354 |
| D627,535 S | 11/2010 | Hermans | | D34/38 |
| 8,109,337 B2 | 2/2012 | Parlee | | E21B 33/06 |
| 9,010,820 B2 | 4/2015 | Orgeron | | E21B 19/06 |
| 9,027,217 B2 | 5/2015 | Cranford et al. | | E21B 19/00 |
| 9,222,494 B2 * | 12/2015 | Roach | | E21B 33/03 |
| 9,353,593 B1 | 5/2016 | Lu et al. | | E21B 33/06 |
| 9,488,023 B2 | 11/2016 | Vogt et al. | | 166/379 |
| 9,500,040 B2 | 11/2016 | Holst et al. | | 166/377 |
| 9,580,977 B2 | 2/2017 | Vogt | | 166/383 |
| 9,738,199 B2 | 8/2017 | Shamas et al. | | 166/379 |
| 10,352,106 B1 | 7/2019 | Vogt et al. | | E21B 15/003 |
| 2013/0233562 A1 | 9/2013 | Leuchtenberg | | E21B 33/06 |
| 2015/0068726 A1 | 3/2015 | Vogt | | E21B 41/00 |
| 2015/0226026 A1 | 8/2015 | Kent | | E21B 33/06 |
| 2015/0330556 A1 | 11/2015 | Shamas et al. | | E21B 33/06 |
| 2015/0377409 A1 | 12/2015 | Vogt et al. | | E21B 19/00 |
| 2016/0258225 A1 | 9/2016 | Holst et al. | | E21B 15/00 |
| 2017/0254181 A1 * | 9/2017 | Konduc | | E04B 1/34336 |
| 2020/0291727 A1 * | 9/2020 | Valadares | | E21B 19/00 |

OTHER PUBLICATIONS

Bop Pod Transport Skids, posted at offshoreenergytoday.com, posting date Sep. 24, 2014, [online], [site visited May 6, 2018]. Available from Internet, URL: https://www.offshoreenergytoday.com/tsc-to-provide-bop-pod-transport-skids-for-two-semi-subs/ (Year: 2014).

Tire Press Transport Skid, posted at mechautoco.com, posting date not given, [online], [site visited May 6, 2018]. Available from Internet, URL: http://www.mechautoco.com/portfolio/133-2/ (Year: 2018).

Transport Skids, posted at integrisrentals.com, posting date not given, [online], [site visited May 6, 2018]. Available from Internet, URL: http://www.integrisrentals.com/products/transport-skids/ (Year: 2018).

* cited by examiner

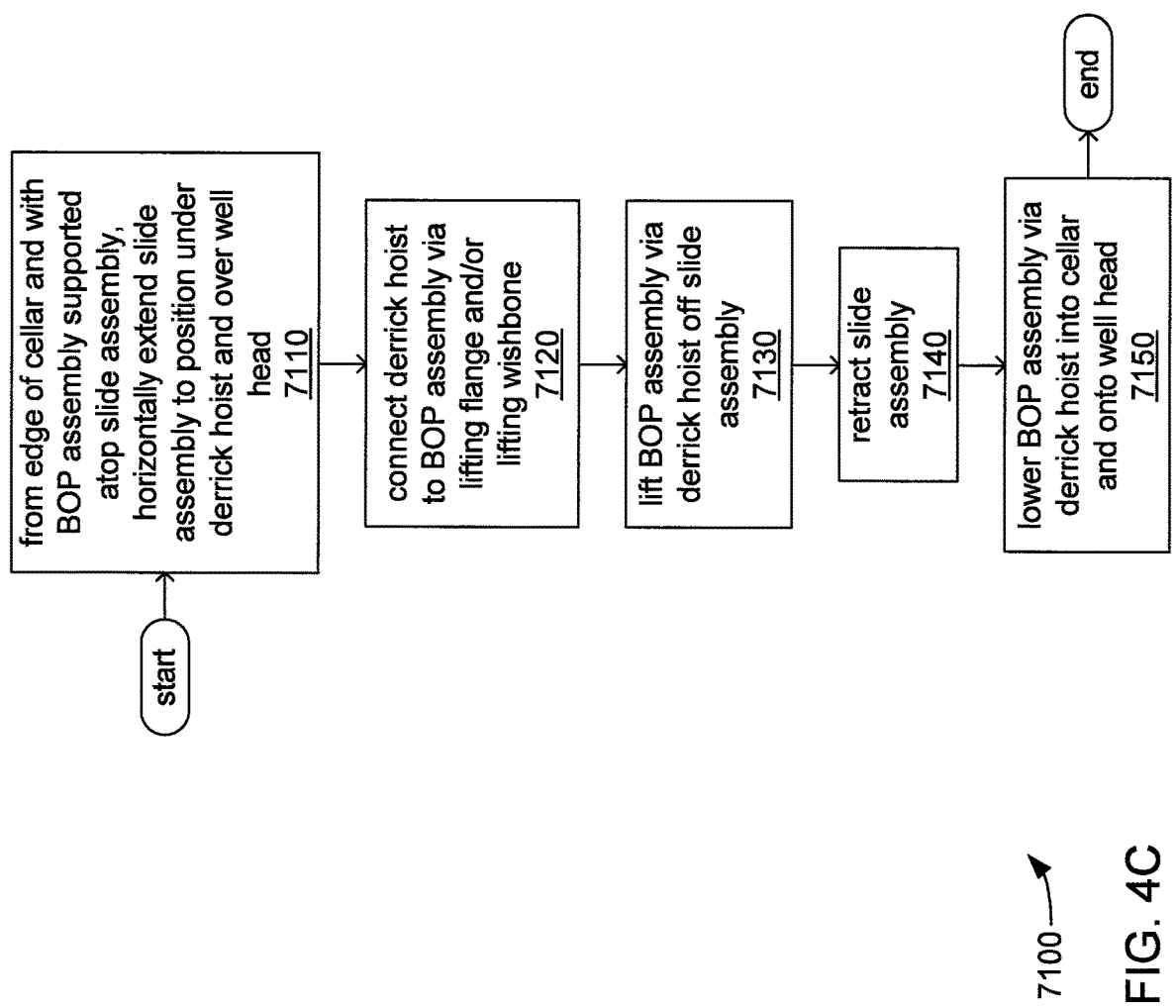

SKID ASSEMBLY FOR TRANSPORTING, INSTALLING AND REMOVING BLOWOUT PREVENTERS

REFERENCE TO PROVISIONAL APPLICATION

This Utility Patent Applications claims the benefit of the filing date of Provisional Application Ser. No. 62/600,741 filed Feb. 28, 2017 by Jason A. Hatfield and James R. Poulson, and entitled SKID ASSEMBLY FOR TRANSPORTING, INSTALLING AND REMOVING BLOWOUT PREVENTERS, the disclosure of which is incorporated herein by reference in its entirety. This Utility Patent Applications is also a continuation-in-part of, and claims the benefit of the filing date of, Design patent application Ser. No. 29/620,565 filed Feb. 23, 2017 by Jason A. Hatfield and James R. Poulson, and entitled TRANSPORT AND POSITIONING SKID HAVING EXTENSIBLE AND RETRACTABLE RELATIVELY MOVABLE UPPER AND LOWER COMPONENTS, the disclosure of which is incorporated herein by reference in its entirety.

BACKGROUND

The present invention relates to the field of tools employed to install and remove blowout preventers (BOPs) used with oil and natural gas wells. A BOP is typically installed on a well head of an oil or natural gas well to prevent or stop a "blowout" in which there is an uncontrolled release of oil or natural gas therefrom. Typically, a BOP is installed when the drilling, lining and cementing of a bore hole of a well, such that the bore hole has been at least partially lined with sections of piping, has reached a stage where there is at least a temporary well head in place to attach a BOP to. Thereafter, further drilling, lining and/or cementing of more of the bore hole may be performed through the BOP. As part of completing the drilling, lining and/or cementing of the bore hole, a valve may be installed at or toward the bottom end of the well. With that valve in place, the BOP may then be removed from the well head. At a subsequent time, surface piping to convey oil or natural gas from the well may then be connected to the well when the well is put to use to serve as a source of oil or natural gas.

Thus, a BOP is typically installed to prepare for handling an emergency event such as a leak, spill, fire or other situation that may arise during such drilling, lining and/or cementing that necessitates operating the BOP to cut off oil or natural gas that may emanate from a well during such an emergency event. As familiar to those skilled in the art, cutting off oil or natural gas in such an emergency may subject a BOP to pressures as high as thousands of pounds per square inch from a well. Also, even without the occurrence of such an emergency, the fact that at least some drilling, lining and/or cementing is performed through a BOP results in that BOP being subjected to vibrations and/or impacts from drilling equipment, sections of piping, abrasive cementing materials and/or abrasive drilled-out debris passing through the BOP, thereby creating a risk of damaging the BOP.

To ensure that a BOP will be able to perform its function despite such harsh conditions, a typical BOP includes multiple redundant valve components to cut off oil or gas flow. However, this need for such redundancy of components, coupled with such potentially high pressures results in a BOP being typically formed from relatively large, thick and heavy metal components such that a fully assembled BOP may be several feet tall and weigh many tons. This may cause the transport of a BOP by truck and/or railway flat car under signs, bridges, power lines, toll booth roofs, station roofs and/or other overhanging structures to be quite difficult. The large size and weight of a typical BOP can also add to the difficulties of their installation and removal at a well site.

The well head of an oil or gas well at a well site is typically at a location below ground level within an open-top, concrete-lined structure called a "cellar" that typically somewhat resembles the basement of a small house. More precisely, the well head typically emerges from the ground through the floor of such an open-top cellar, which in a manner also resembling a basement of a small house, may be lined with concrete. However, instead of a house being built atop such an open-top cellar, the drilling rig that was used to drill and line the bore hole of the well associated with the well head is built thereon.

Such a drilling rig typically includes a steel tower and a rig floor that is supported by the tower at a position that overlies the open-top cellar. The steel tower supports the drill used to drill the bore hole of the well, and the rig floor defines a hole therethrough that is directly above the well. During drilling, the drill extends through the hole through the rig floor to drill the bore hole thereunder; and during lining of the bore hole, lengths of piping may be lowered into the bore hole through the hole in the rig floor. The rig floor is typically supported at a height that provides about fourteen feet (or less) of vertical clearance between the bottom of the rig floor and the upper edge of the walls of the open-top cellar. Thus, the placement of the rig floor relative to the cellar may make the installation of a BOP atop the well head more difficult.

Additionally, within the cellar, the well head is typically closely surrounded by various other pieces of equipment that were used in drilling the well and/or that are to be used in the operation of the well to extract oil or natural gas therefrom. Thus, there is often relatively little room within the cellar around the well head for personnel to move about to gain access to the well head. These various factors often make the installation onto a well head and the removal therefrom of a BOP a rather dangerous operation in which personnel must be down within the cellar, with numerous heavy pieces of equipment suspended overhead, to use various tools to turn bolts and/or take other actions to connect the BOP to the well head or to disconnect the BOP therefrom. As a result, it is not uncommon for personnel in the industry to refer to the interior of the cellar of a well as the "kill zone" due to the heightened likelihood of accidents that may occur therein in which personnel may very well be injured or killed.

The closely overlying position of the rig floor above the upwardly-facing opening of the cellar usually exacerbates the aforedescribed difficulties and dangers of installing or removing a BOP by requiring a BOP to be horizontally moved through the limited vertical clearance between the uppermost edge of the walls of the cellar and the underside of the overlying rig floor, above. Unfortunately, there does not exist an articulating forklift, bulldozer or other type of lifting vehicle that has the needed lifting capacity at a sufficiently long cantilever length to perform such a horizontal move of a fully assembled BOP through such limited vertical clearance and far enough into the space between the rig floor and the cellar to reach a location directly above the well head. A typical fully assembled BOP is simply too heavy.

As a result, a common approach to address these difficulties and dangers is to install or remove a BOP in as multiple BOP components (and not as an assembled unit), one at a time, through the limited vertical clearance, using an articulated forklift. Unfortunately, the fact that each such component of a BOP must be handled separately in this manner greatly increases the amount of time that personnel must spend down within the cellar to separately connect or disconnect each such BOP component, thereby greatly increasing the exposure of such personnel to the various dangers therein. Additionally, the need to coordinate each of multiple instances of use of an articulating forklift operated by personnel outside of the cellar with actions taken by personnel who are within the cellar creates multiple opportunities for dangerous mistakes to be made arising from miscommunication among such personnel as each such BOP component is separately handled.

SUMMARY

The present invention addresses such needs and deficiencies as are explained above by providing an elongate skid assembly that includes a base assembly and a slide assembly for transporting, installing and removing BOPs. Such a skid assembly may be used to securely retain components of a BOP in a disassembled configuration for safer transport atop the flatbed of a truck or atop a flatcar of a train. Such a skid assembly may then be lowered onto the ground at a position near the cellar of a well site to enable the slide assembly to be extended over the well head as part of a procedure to more safely install or remove a BOP in a fully assembled configuration.

More specifically, the base assembly forms a lower component of the skid assembly that is placed upon the ground adjacent an edge of a cellar at a well site, and the slide assembly forms an upper component of the skid assembly. The slide assembly is horizontally movable relative to the base assembly and into the vertical space between the edge of the cellar and the rig floor above the cellar to reach a position directly above the well head to enable installation or removal of a fully assembled BOP that is supported atop the slide assembly. By enabling the installation onto a well head or removal therefrom of a BOP in a fully assembled configuration, the time required for personnel to remain within the "kill zone" of the interior of the cellar is minimized as they need only be present to connect the fully assembled BOP to the well head or to disconnect the fully assembled BOP therefrom.

The skid assembly is configured to be slided onto and off of a flat bed truck equipped with a winch to enable positioning of the skid assembly adjacent the edge of the cellar without the use of a crane or other separate lifting vehicle. The upper component or slide assembly defines multiple support positions (typically two support "stations") atop which separate components of a BOP may be securely supported in place for transport of the BOP together with the skid assembly via truck on typical roadways and/or by flat car of a train without risk of collisions with overhanging signs, signals, bridges, power lines, toll booth roofs, station roofs, etc. Thus, assembly of a BOP for installation or disassembly of a removed BOP is able to take place at the location of the skid assembly adjacent to the edge of the cellar, where there is more room for personnel to safely move about, rather than take place within the cellar where such favorable conditions typically do not exist.

BRIEF DESCRIPTION OF THE DRAWINGS

A fuller understanding of what is disclosed in the present application may be had by referring to the description and claims that follow, taken in conjunction with the accompanying drawings, wherein:

FIG. 4C is a flow chart of an embodiment of a procedure for using the skid assembly of FIG. 1A to install an assembled BOP onto a well head of a well site.

DETAILED DESCRIPTION

Figure 1A:
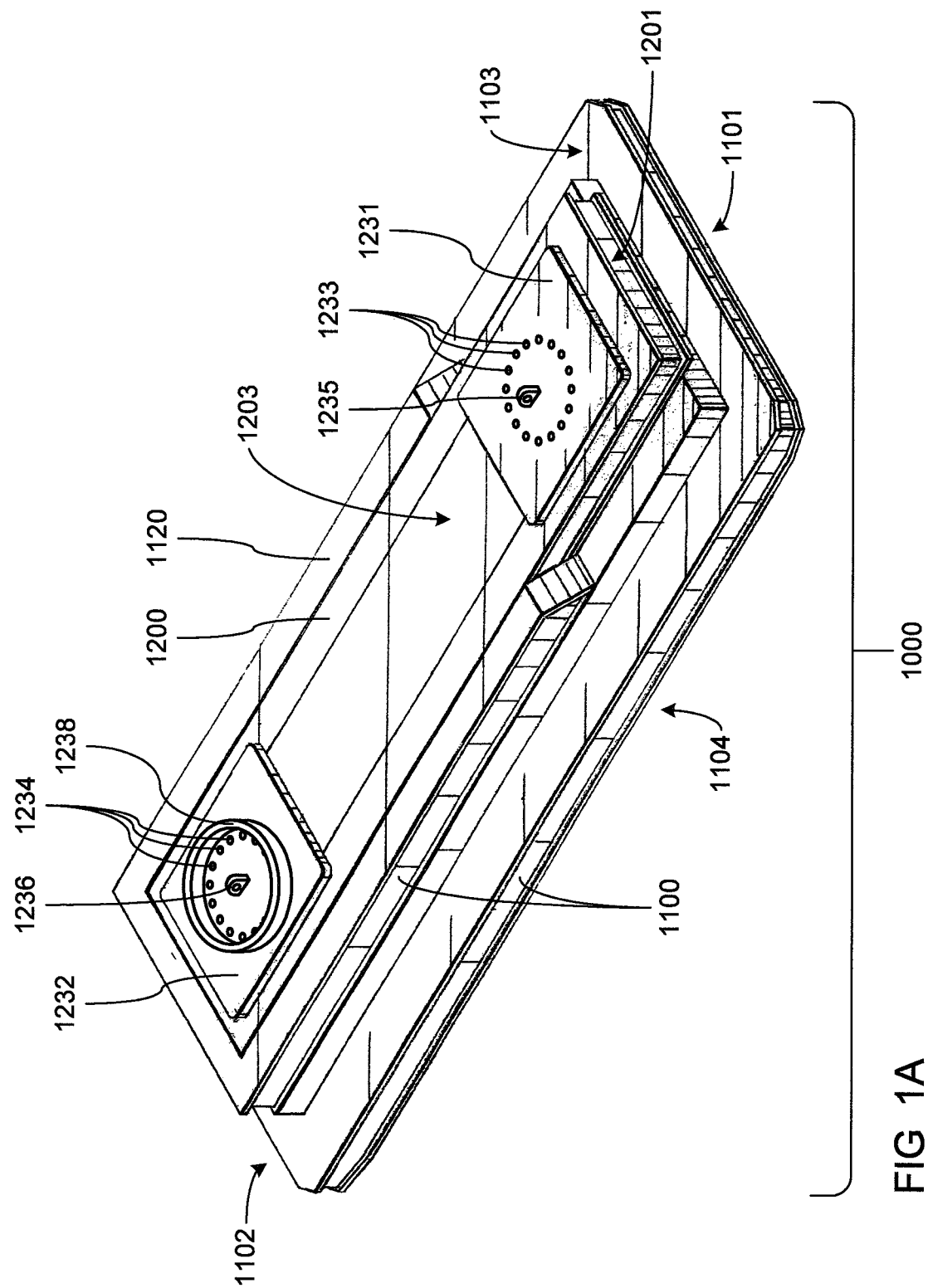
FIG. 1A is a perspective view, from above, of an example embodiment of a skid assembly for transporting, installing and removing BOPs, showing an upper component thereof in a retracted position relative to a lower component thereof, and showing support stations mounted to the upper component without BOP components being supported thereon.
Figure 1B:
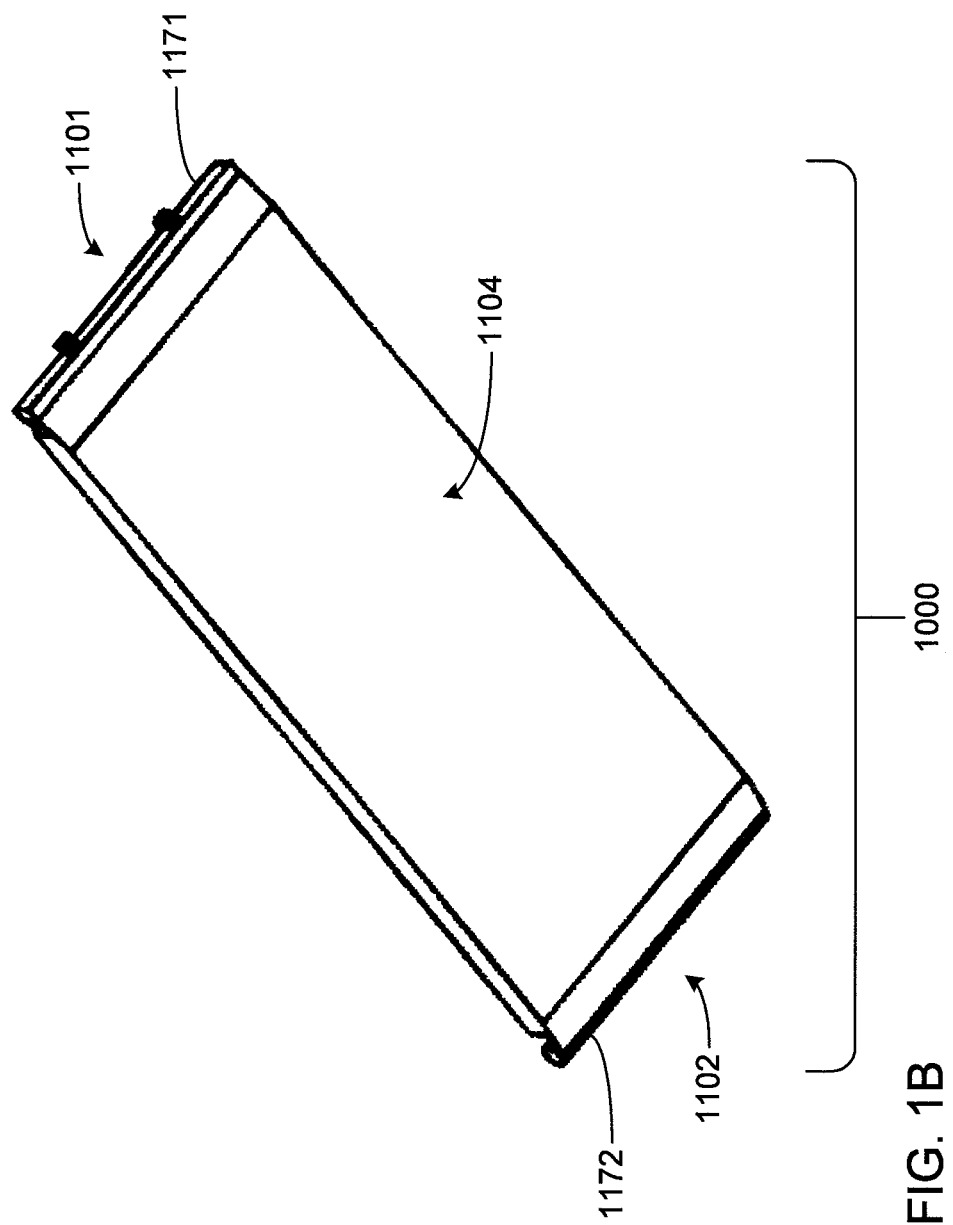
FIG. 1B is a perspective view thereof, from below.
Figure 1C:
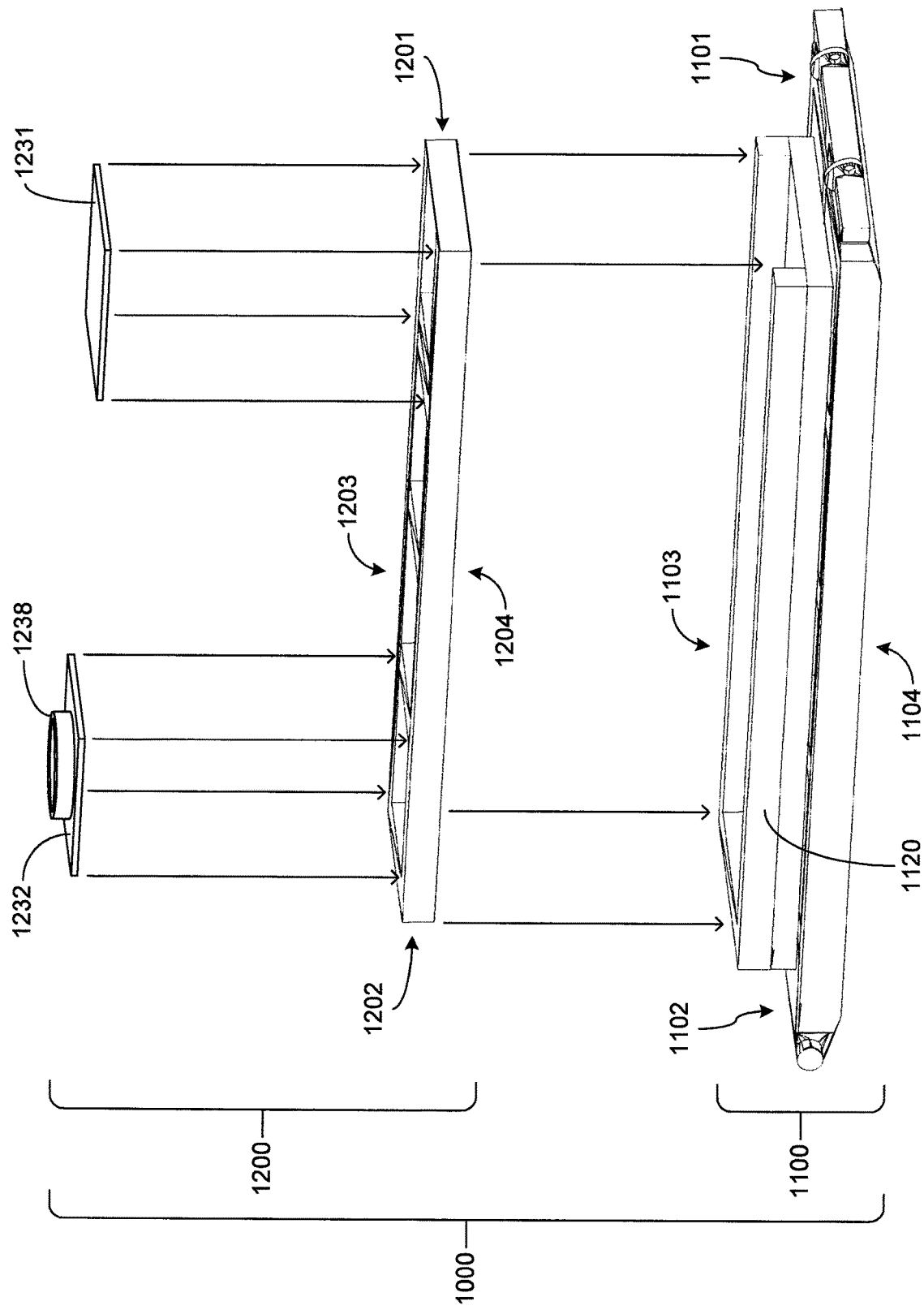
FIG. 1C is an exploded perspective view thereof, showing the upper component separated from the lower component, and showing the support stations separated from the upper component.

FIGS. 1A through 1I, taken together, depict aspects of a novel skid assembly 1000 for transporting blowout preventers (BOPs) to and from well sites, and for installing BOPs onto or removing BOPs from well heads at well sites. As best seen in FIG. 1C, the skid assembly 1000 includes a lower component or base assembly 1100 and an upper component or slide assembly 1200. The skid assembly 1000 is of a substantially flat and elongate, generally rectangular shape that is defined by the stacking of the substantially flat and elongate generally rectangular shape of the slide assembly 1200 atop the also substantially flat and elongate generally rectangular shape of the base assembly 1100. The slide assembly 1200 is able to slided horizontally relative to the base assembly 1100.

The base assembly 1100 of the skid assembly 1000 is meant to be supported in a substantially flat horizontal orientation atop such surfaces as the ground, the flat bed of a flat bed of a vehicle such as a flat bed truck or a railway flat car, the floor of a workshop or garage, etc. The slide assembly 1200 of the skid assembly 1000 is suited to carry a BOP (in either an assembled or disassembled state) and to slide in a substantially horizontal direction relative to the base assembly 1100 to reach into a space between a rig floor and an edge of an upwardly-opening cellar as part of installing or removing a fully assembled BOP.

Figure 1D:
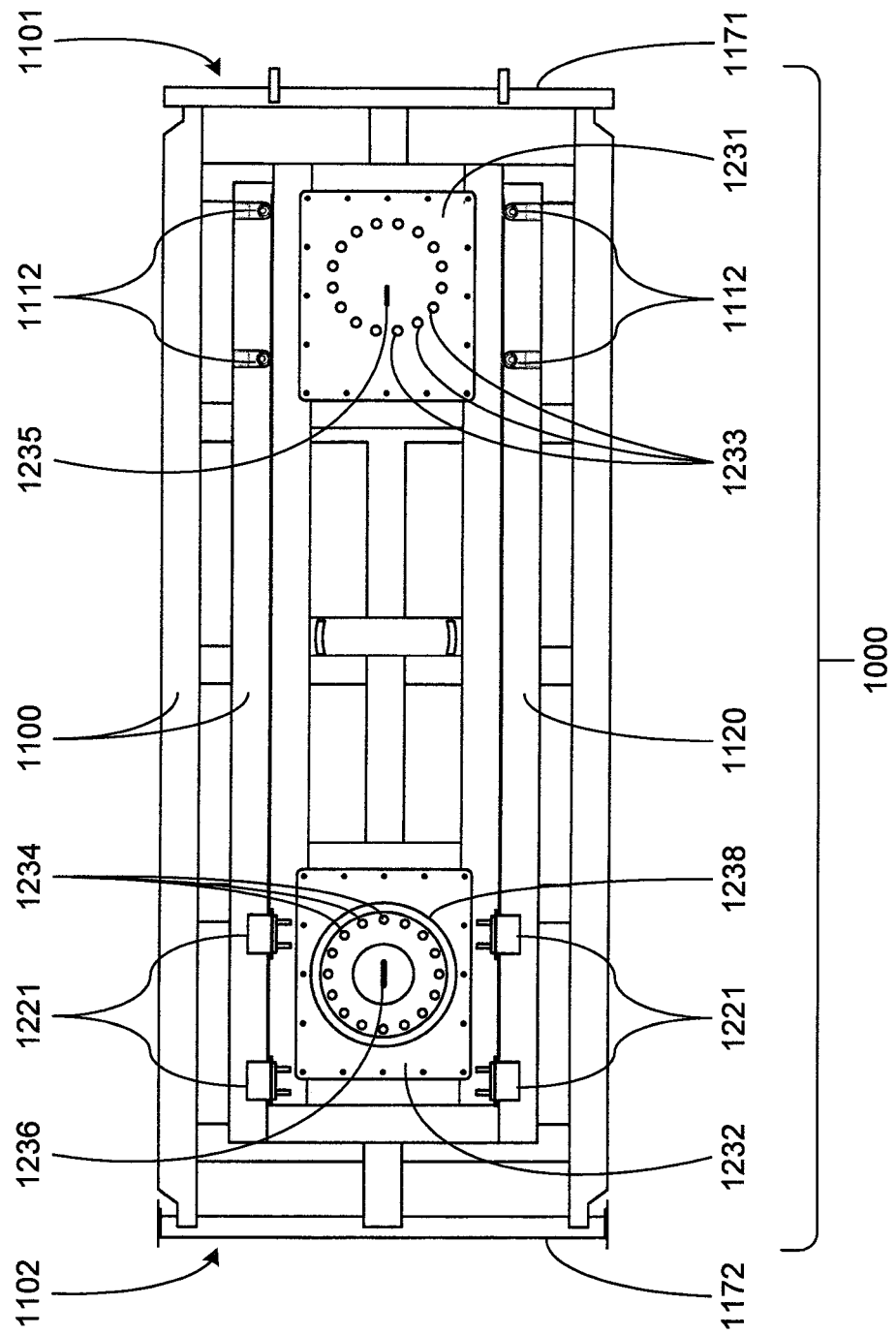
FIG. 1D is an elevational view thereof, from above, showing guide and support rollers to support movement of the upper component relative to the lower component between the depicted retracted position and a range of extended positions.
Figure 1E:
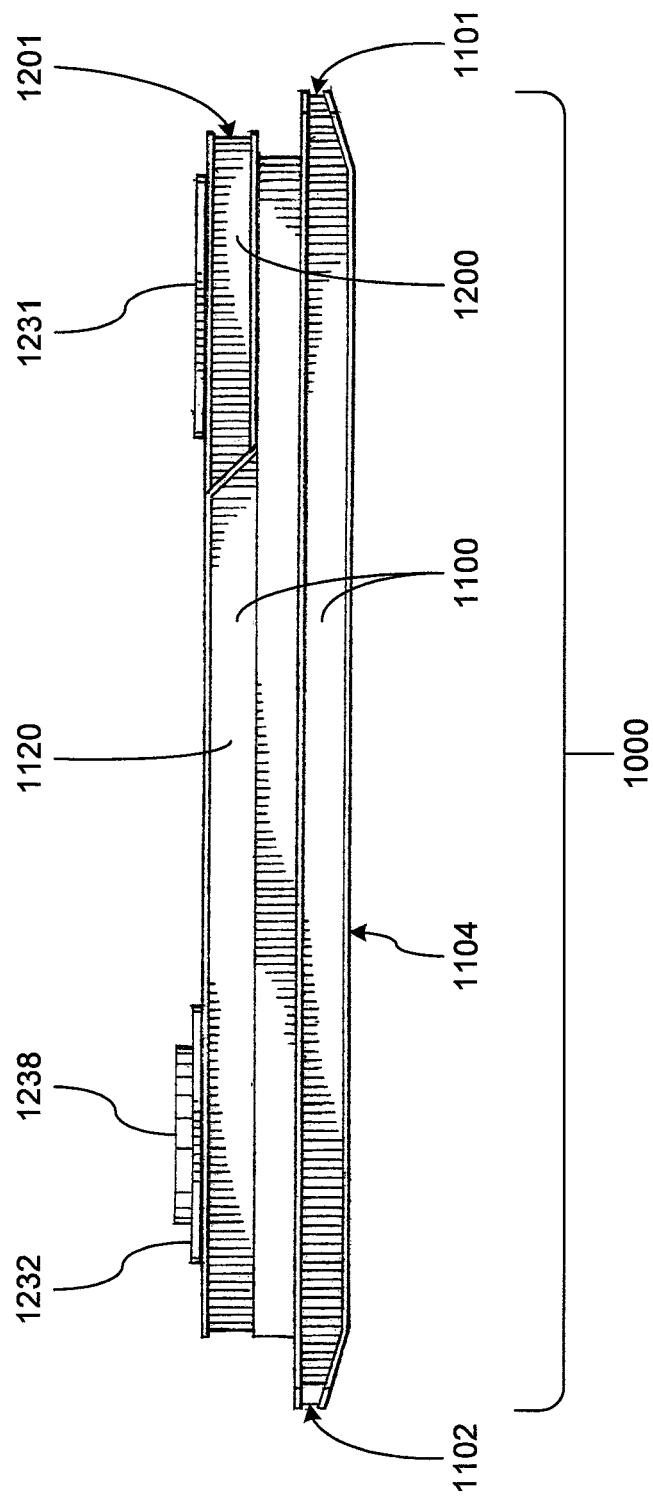
FIG. 1E is a side elevational view thereof.
Figure 1F:
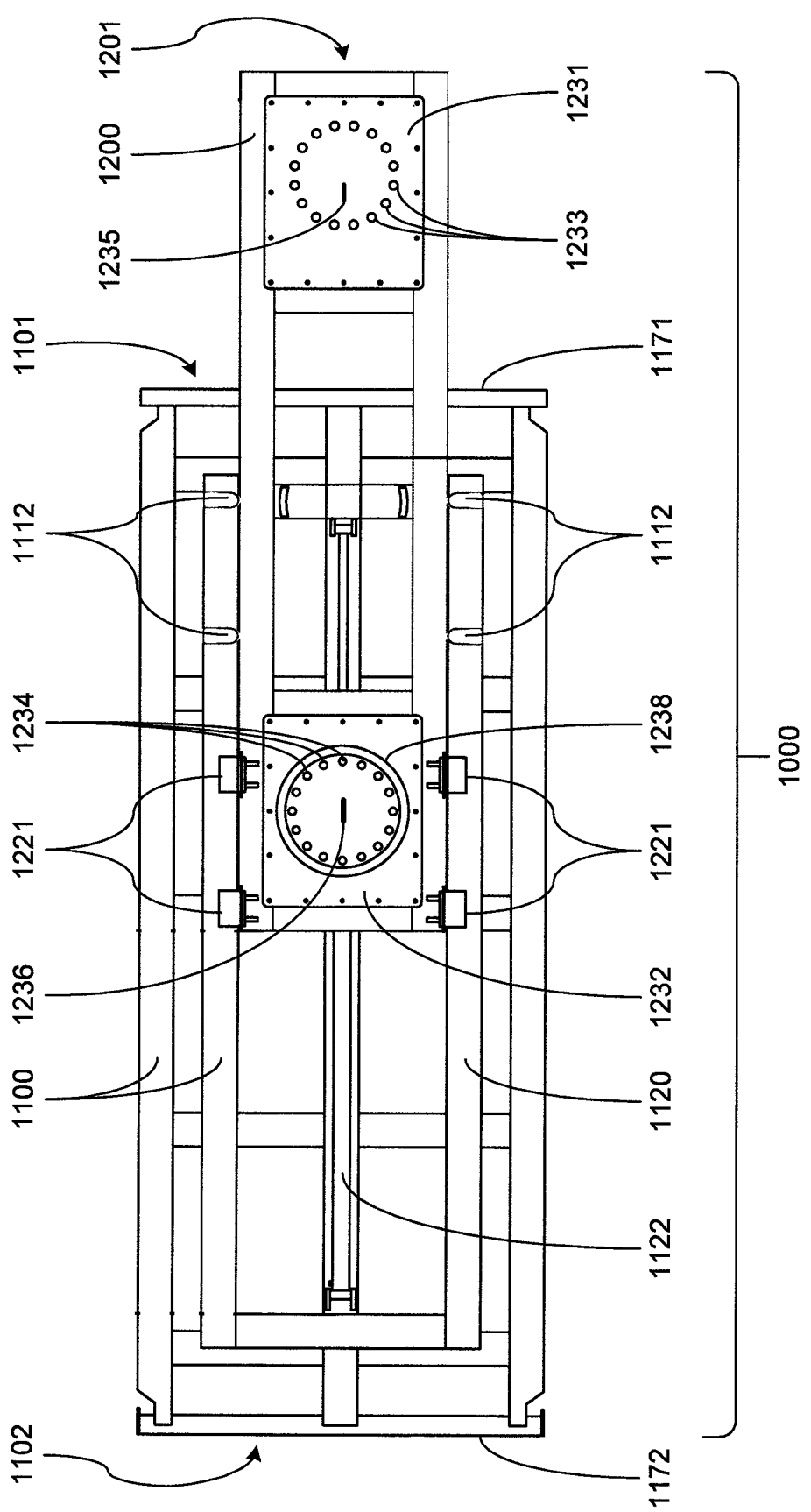
FIG. 1F is an elevational view thereof, from above, showing the upper component moved to an extended position relative to the lower component.
Figure 1G:
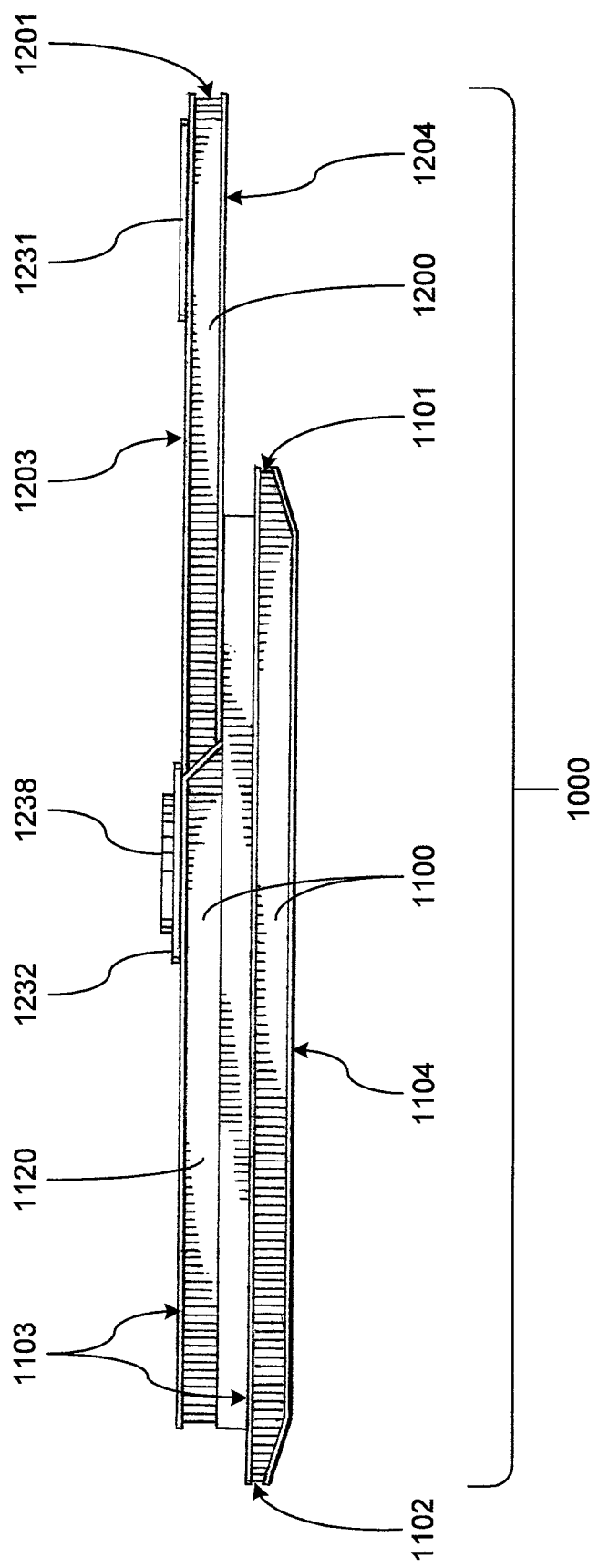
FIG. 1G is a side elevational view thereof.

The base assembly 1100 may include a U-shaped guide 1120 extending upward to surround at least part of three sides of the periphery of the slide assembly 1200 to guide the slide assembly 1200 in its horizontal sliding movement between a retracted position such as the position depicted in FIGURES 1A-B and 1D-E, and an at least partially extended position such as the position depicted in FIGS. 1F-G. As best depicted in FIG. 1D, the base assembly 1100 may also include a loading hitch 1171 carried at one end 1101 of the elongate rectangular shape of the base assembly 1100, and/or may include a loading hitch 1172 carried at the opposite end 1102 thereof, to enable the skid assembly 1000 (possibly with at least one component of a BOP supported atop the slide assembly 1200) to be pulled by the winch of a truck (not shown) onto the flat bed of the truck and/or to be controllably lowered by the winch from the flat bed.

Figure 1H:
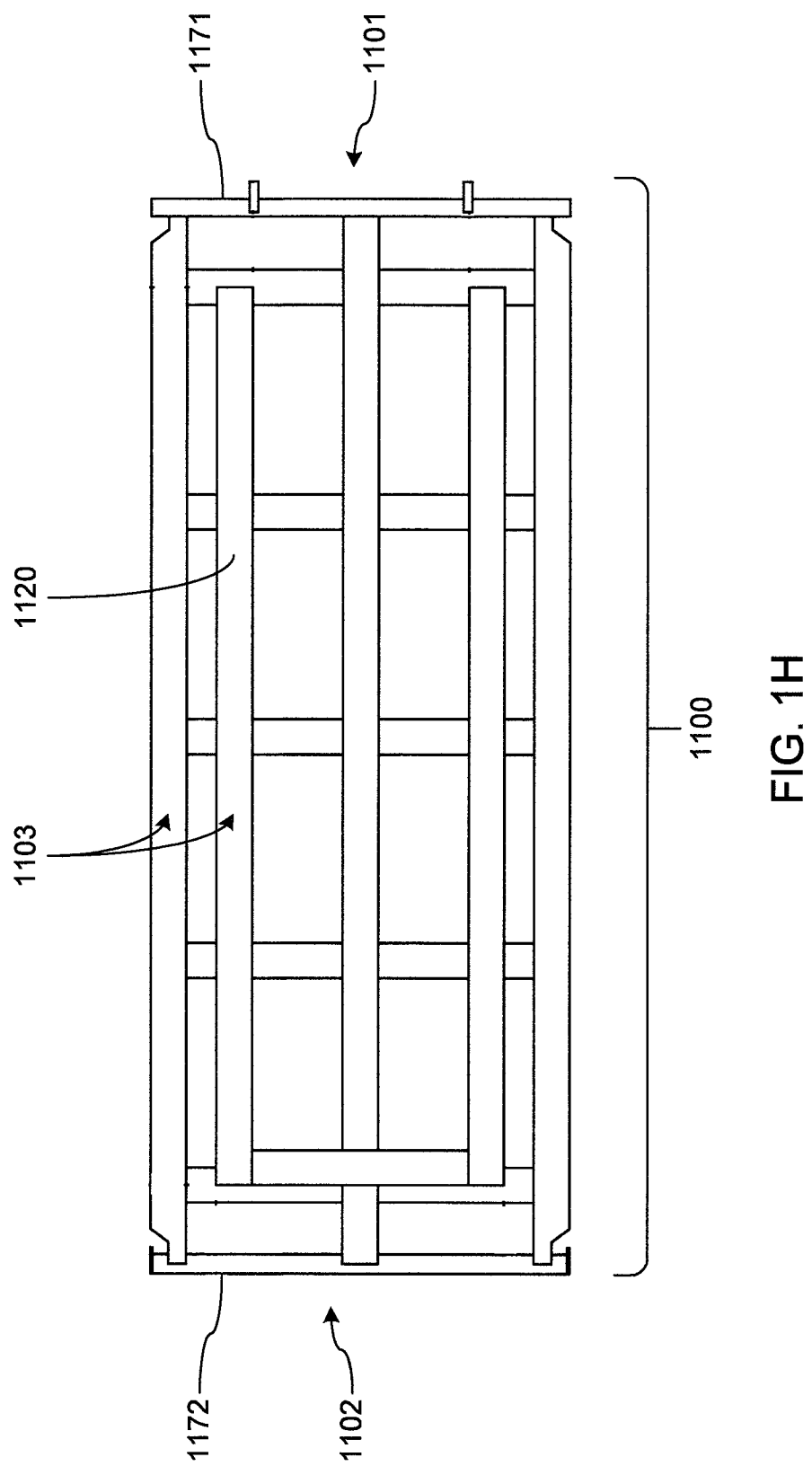
FIG. 1H is an elevational view of the lower component, from above, and with the upper component entirely removed.

FIG. 1H provides a view from above of the top of the base assembly 1100 with the slide assembly 1200 removed therefrom. As depicted, much of the structure of the base assembly 1100 may be defined by a lattice of structural components that may be fabricated from steel, and that may be welded together to form the lattice. Underlying the depicted lattice may be a continuous sheet of steel that may be welded to the lattice, and that may extend substantially the full length and width of the elongate rectangular shape of the base assembly 1100 to provide the base assembly 1100 with a single continuous bottom or support surface 1104 (best seen in FIG. 1B) by which the skid assembly 1000 may be supported atop a substantially flat surface. Such a continuous support surface may aid in enabling the skid assembly 1000 to be dragged across a substantially flat surface to better position the skid assembly 1000 relative to the edge of a cellar at a well site.

Figure 1I:
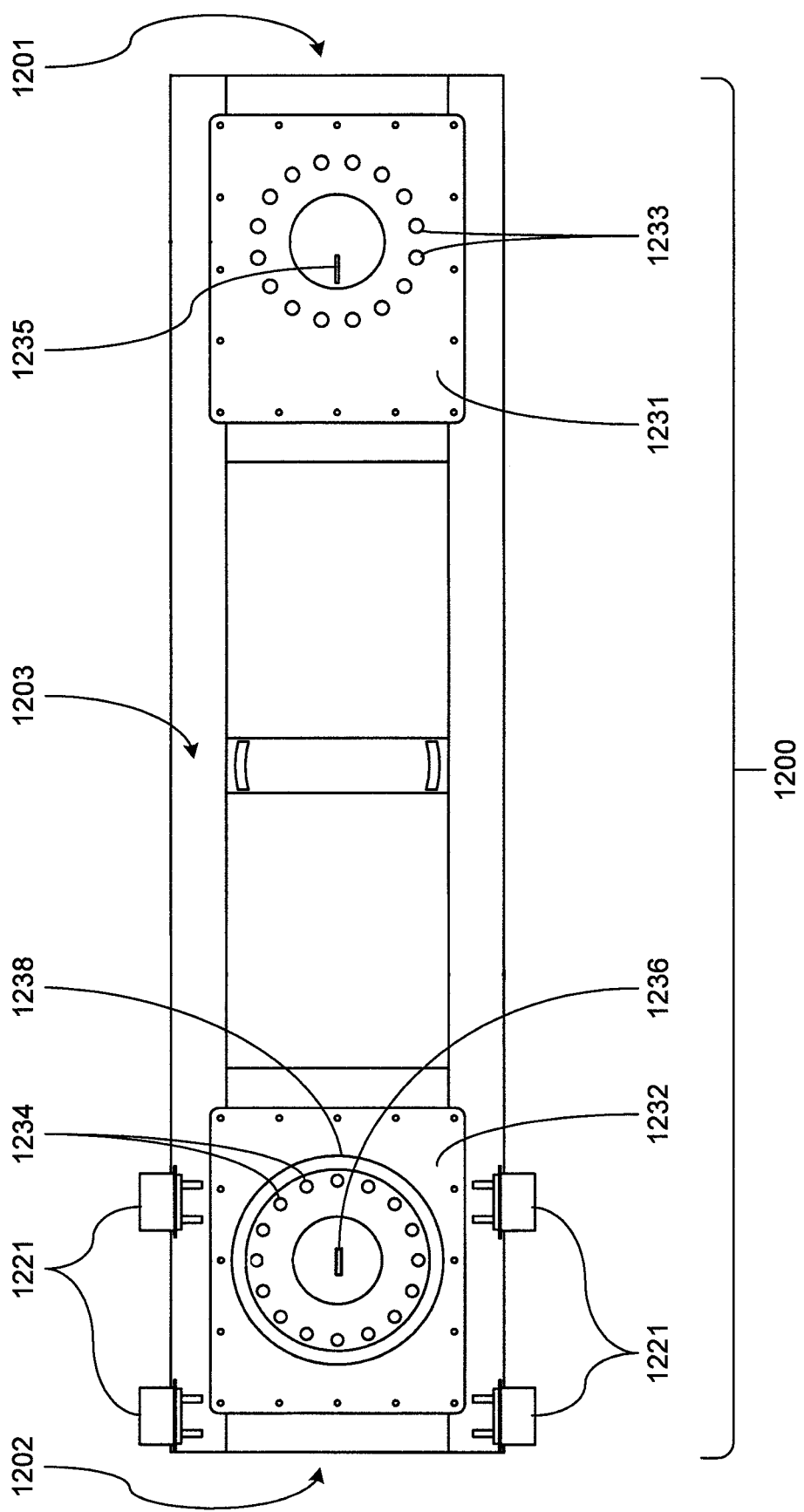
FIG. 1I is an elevational view of the upper component, from above, and removed from the lower component.

FIG. 1I provides a view from above of the top of the slide assembly 1200 separate from the base assembly 1100. As depicted, much of the structure of the slide assembly 1200 may also be defined by a lattice of structural components that may also be fabricated from steel and that may also be welded together to form the lattice. As depicted, overlying an upper surface 1203 of the slide assembly defined by the lattice may be one or more support plates, such as the depicted support plate 1231 at one end 1201 of the slide assembly 1200 and/or the depicted support plate 1232 at the other end 1202, each of which may also be fabricated from steel and/or may be welded onto the upper surface 1203 of the slide assembly 1200. Each of such one or more support plates may support one or more separated components of a BOP, and/or may support a fully assembled BOP atop the slide assembly 1200.

FIG. 1C provides a view of assembly of the skid assembly 1000 from the base assembly 1100, the slide assembly 1200 and one or both of the support plates 1231 and 1232. Either prior to the mounting of the support plates 1231 and/or 1232 to the upper surface 1203 of the slide assembly 1200, the slide assembly 1200 may be oriented to cause the lower surface 1204 thereof to face toward the upper surfaces 1103 of the base assembly 1100, and to align the ends 1201 and 1202 of the slide assembly with the ends 1101 and 1102, respectively, of the base assembly. The slide assembly 1200 may then be lowered into a position in which the periphery of the slide assembly, including the end 1202, is surrounded by the U-shaped guide 1120 that defines the uppermost portion of the base assembly 1100.

Returning more broadly to FIGS. 1A-I, as depicted, the pair of support plates 1231 and 1232 may not cover and/or extend the full length and/or width of the upper surface 1203 of the elongate rectangular shape of the slide assembly 1200 defined by its lattice of structural components. However, despite this depiction, it should be noted that other embodiments are possible in which the lattice of structural components of the slide assembly 1200 may carry a single support plate and/or multiple support plates atop the upper surface 1203 that do cover and/or extend its full length and/or width.

As depicted, one or more of the support plates 1231 and/or 1232 that may be carried by the slide assembly 1200 may have a mounting pattern 1233 and/or 1234, respectively, of mounting holes formed therethrough (best seen in FIGS. 1D, 1F and 1I) that may be arranged to align with corresponding mounting holes of a flange of at least one component of a BOP. Alternatively or additionally, one or more of the support plates 1231 and/or 1232 that may be carried by the slide assembly 1200 may include an eyelet 1235 and/or 1236, respectively, (best seen in FIG. 1A) or other similar type of anchor point to which a strap, cable, chain, etc. may be coupled to aid in securing at least a component of a BOP thereto. In embodiments in which the one or more support plates carried by the slide assembly 1200 may be exchangeable, possibly to accommodate the components of different BOPs, such a feature as the eyelets 1235 and/or 1236 may be provided to enable a hook, clevis or other hardware of a winch or other lifting device to be used to lift and move about such support plates. Also alternatively or additionally, one or more of the support plates 1231 and/or 1232 that may be carried by the slide assembly 1200 may include a collar to surround a portion of at least a component of a BOP, such as the depicted collar 1238 carried by the depicted support plate 1232.

As an alternative to, or in addition to, the eyelets 1235 and/or 1236 that may be carried by the support plates 1231 and/or 1232, one or more other eyelets (not specifically shown) may be carried on various portions of the upper surfaces 1103 of the base assembly 1100 and/or on various portions of the upper surface 1203 of the slide assembly 1200. In a manner that will be familiar to those skilled in the art, components of a BOP and/or a fully assembled BOP that may be supported atop such support plates as the support plates 1231 and/or 1232 may be secured to the skid assembly 1000 to enable the safe transport thereof by the use of belts, straps, cables, chains, etc. connected to such eyelets.

As showing in FIGS. 1D, 1F and 1I, the slide assembly 1200 may carry one or more pairs of support rollers 1221 to engage portions of the upper surface 1103 of the base assembly 1100 that are defined by U-shaped guide 1120 as part of an interaction between the slide assembly 1200 and at least the U-shaped guide 1120 of the base assembly 1100 to support horizontal extension and retraction movements of the slide assembly 1200 relative to the base assembly 1100. Alternatively or additionally, the base assembly 1100 may carry one or more pairs of guide rollers 1112 to engage portions of the periphery of the slide assembly 1200 as part of an interaction between the base assembly 1100 and the slide assembly 1200 to guide the extension and retraction movements of the slide assembly 1200 relative to the base assembly 1100. As show in FIG. 1F, a hydraulic cylinder 1122 may be connected to both the slide assembly 1200 and the base assembly 1100 to employ hydraulic pressure to move the slide assembly 1200 relative to the base assembly 1100 between retracted and extended positions.

Figure 2A:
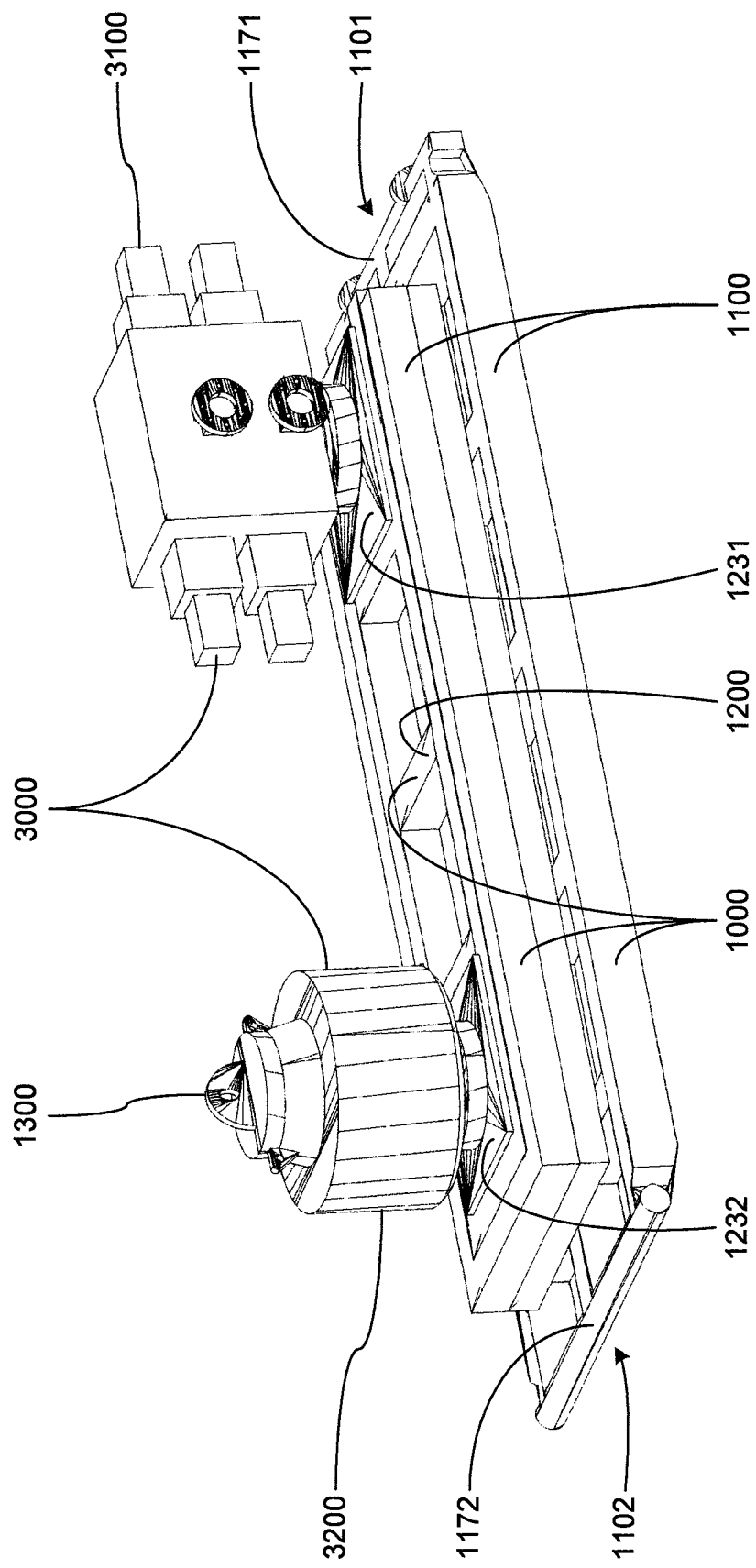
FIG. 2A is a perspective view, from above, of the skid assembly of FIG. 1A, showing BOP components of a disassembled BOP supported on the support stations thereof in a manner enabling transport of the disassembled BOP by flat bed truck or railway flat car.
Figure 2B:
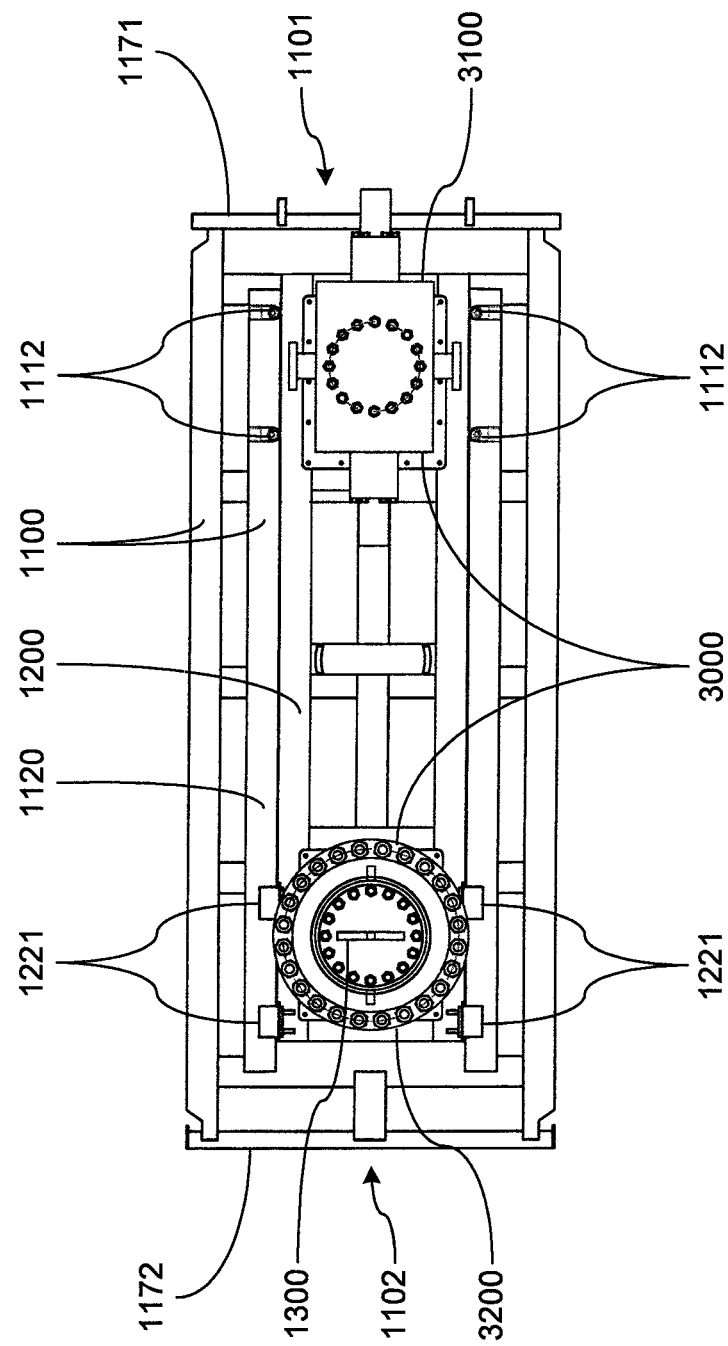
FIG. 2B is an elevational view thereof, from above.
Figure 2C:
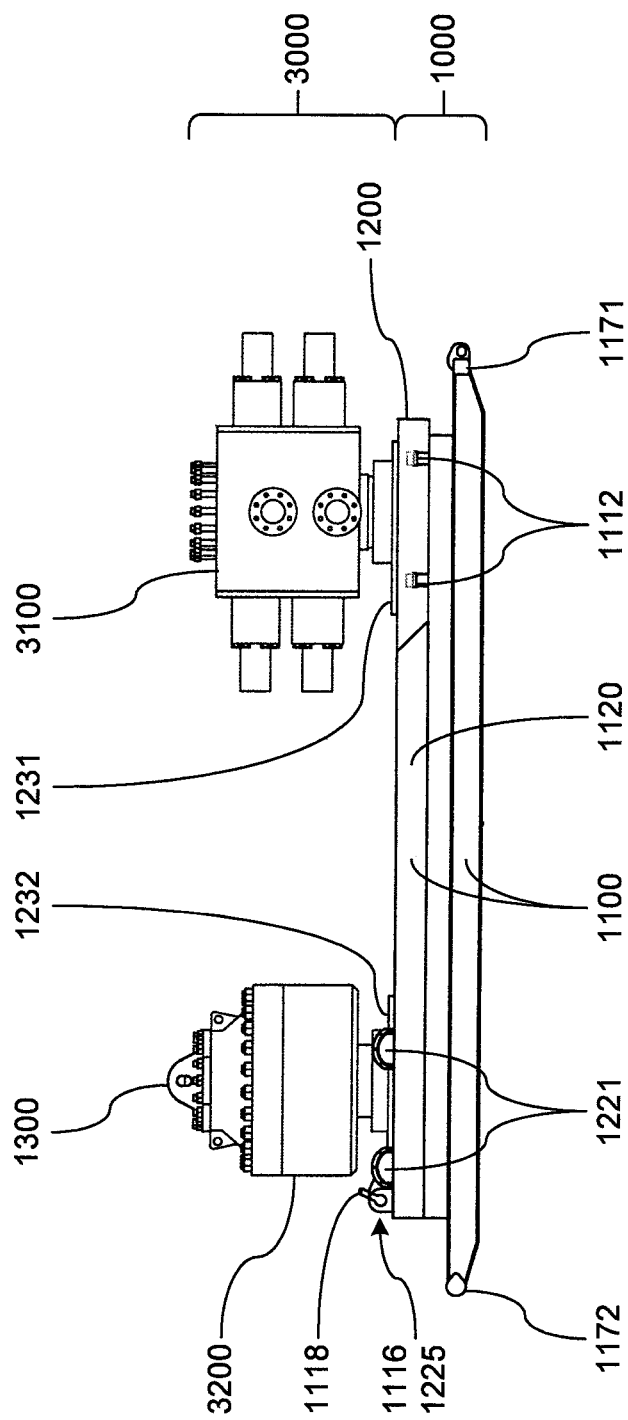
FIG. 2C is a side elevational view thereof.

FIGS. 2A through 2C, taken together, depict aspects of using the skid assembly 1000 to transport an example BOP assembly 3000 in a disassembled state to and from well sites where the BOP assembly 3000 may be installed atop a well head. More specifically, BOP components 3100 and 3200 of the BOP assembly 3000 may be separately supported atop one or more support plates carried by the slide assembly 1200, such as the earlier-discussed support plates 1231 and 1232, respectively, each of which may be said to define a "support station" at which a BOP component or an fully assembled BOP. The depicted example BOP assembly 3000 may include a double-ram BOP 3100 and an annular BOP 3200. In some embodiments, such a BOP assembly 3000 may include further connecting components, such as a rotating coupler (not shown) to connect such a BOP assembly 3000 to a pipe or pipe fitting into which oil or gas emanating from a well head may flow after flowing through the BOP assembly 3000 during a time when the BOP assembly 3000 is not operated to cut off such a flow.

As has been discussed, such supporting of such separate components 3100 and/or 3200 of the example BOP assembly 3000 atop the slide assembly 1200 may be done to enable the transport of the BOP assembly 3000 and the skid assembly 1000 together on typical roadways using a flat bed truck and/or on typical railways using a flat car. Again, when fully assembled such that the annular BOP 3200 is connected atop the double-ram BOP 3100, the combined height of the BOP assembly 3000 in such a fully assembled state, the skid assembly 1000 and the flat bed portion of a flat bed truck or railway flat car may be too great to allow passage underneath signs, bridges, power lines, toll booth roofs, station roofs and/or other overhead objects that may be positioned above typical roadways and/or railways. Disassembling and separately supporting the components 3100 and 3200 of the BOP assembly 3000 may reduce the combined height sufficiently to avoid collisions with such overhead objects during roadway and/or railway transport.

As previously discussed, one or more of the support plates 1231 and/or 1232 that may be carried by the slide assembly 1200 may include mounting patterns 1233 and/or 1234, respectively, of mounting holes formed therethrough that may be arranged to align with corresponding mounting holes of a flange of at least one of the components 3100 or 3200 of the example BOP 3000. Thus, such a mounting pattern 1233 as may be formed through the support plate 1231 may be made up of holes arranged to align with corresponding holes of the flange of the double-ram BOP 3100 that may be used to connect the double-RAM BOP 3100 to a well head. However, while the double-ram BOP 3100 is supported atop the support plate 1231, holes of that flange of the double-ram BOP 3100 may be used in cooperation with aligned holes of the mounting pattern 1233 to secure the double-ram BOP 3100 to the support plate 1231 for transport. More specifically, various fasteners and/or other objects may be extended through one or more aligned ones of the holes of such a flange and of the mounting pattern 1233 to bolt (or otherwise connect) the double-RAM BOP 3100 to the support plate 1231.

Correspondingly, such a mounting pattern 1234 as may be formed through the support plate 1232 may be made up of holes arranged to align with corresponding holes of the flange of the annular BOP 3200 that may be used to connect the annular BOP 3200 to the double-ram BOP 3200. However, while the annular BOP 3200 is supported atop the support plate 1232, holes of that flange of the annular BOP 3200 may be used in cooperation with aligned holes of the mounting pattern 1234 to secure the annular BOP 3200 to the support plate 1232 for transport. More specifically, various fasteners and/or other objects may be extended through one or more aligned ones of the holes of such a flange and of the mounting pattern 1234 to bolt (or otherwise connect) the annular BOP 3200 to the support plate 1232.

As previously discussed, one or more of the support plates 1231 and/or 1232 that may be carried by the slide assembly 1200 may include a collar, such as the earlier depicted collar 1238 of the support plate 1232. Such a collar may be employed to guide the positioning of a component of a BOP onto a support plate. Thus, for example, the collar 1238 may serve to guide the positioning, onto the support plate 1232, of the flange of the annular BOP 3200 that is employed to connect the annular BOP 3200 to the double-ram BOP 3100. This may be deemed desirable to, for example, more quickly and/or accurately align the holes of that flange with mounting holes of the mounting pattern 1234 in preparation for securing the annular BOP 3200 to the support plate 1232. Alternatively or additionally, this may be deemed desirable to aid in preventing the annular BOP 3200 from sliding about atop the support plate 1232 during transport.

As previously discussed, one or more of the support plates 1231 and/or 1232 that may be carried by the slide assembly 1200 may include an eyelet 1235 and/or 1236, respectively, or other component to receive a hook, clevis or other component of a belt, strap, cable or chain. As previously discussed, such an eyelet or other similar component may be used to aid in exchanging and/or moving about support plates in embodiments in which the support plates carried by the slide assembly 1200 are exchangeable, perhaps to accommodate supporting different BOPs. Alternatively or additionally, such an eyelet or other similar component may be used to as a location to which a belt, strap, cable or chain may be coupled to secure a component of a BOP onto one of such support plates.

Either alternatively or in addition to the provision of eyelet(s) and/or similar components on one or more of such support plates, portions of the base assembly 1100 that surround the slide assembly 1200 and/or portions of the slide assembly 1200 may carry one or more eyelets and/or similar components to serve as location(s) to which belts, straps, cables and/or chains may be coupled to secure components of a BOP and/or a fully assembled BOP onto one or more support plates.

Figure 3A:
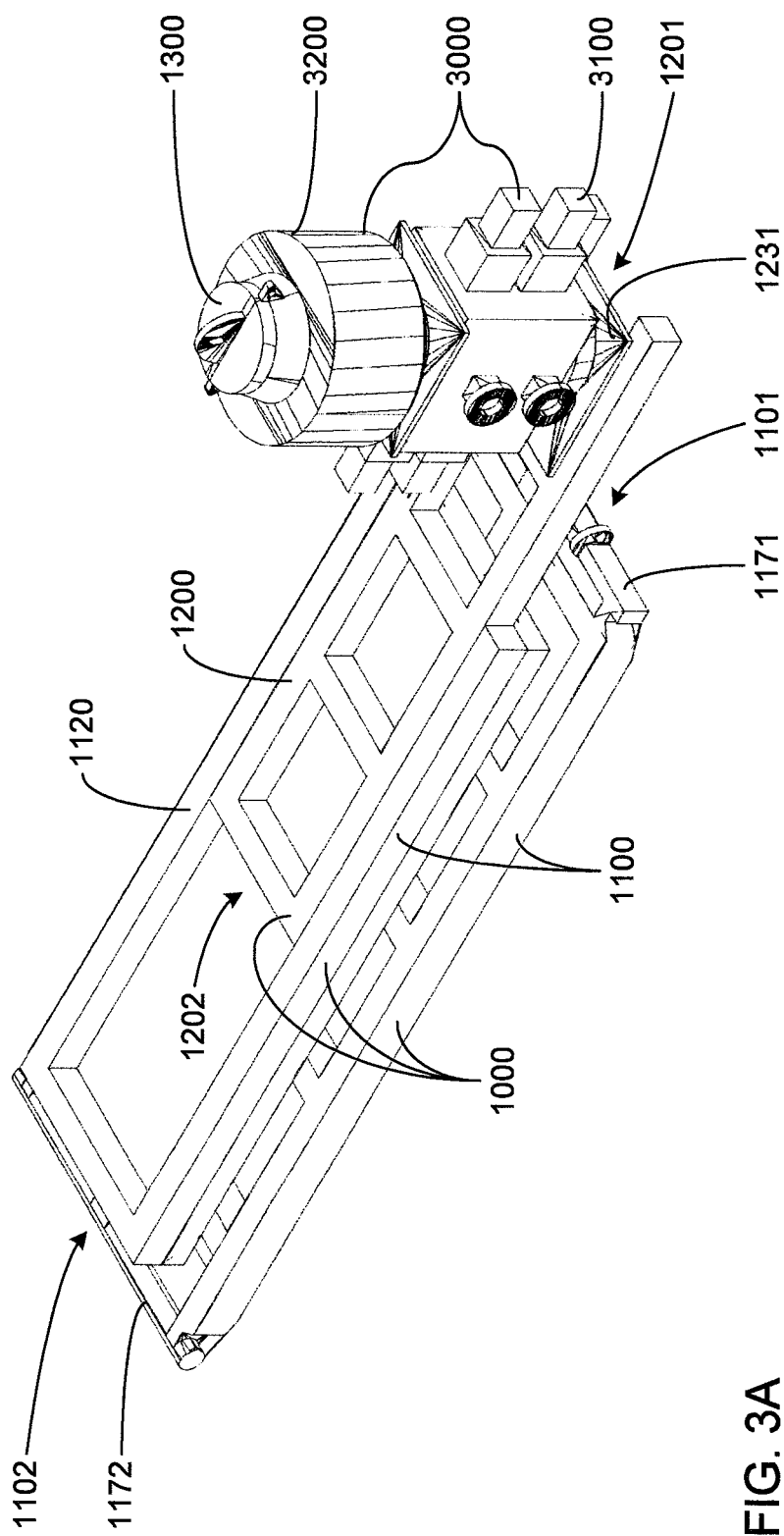
FIG. 3A is a perspective view, from above, of the skid assembly of FIG. 2A, showing the BOP components of the BOP as assembled and supported on one of the support stations thereof, and with the upper component of the skid assembly in an extended position relative to the lower component as part of effecting the installation or removal of the assembled BOP.
Figure 3B:
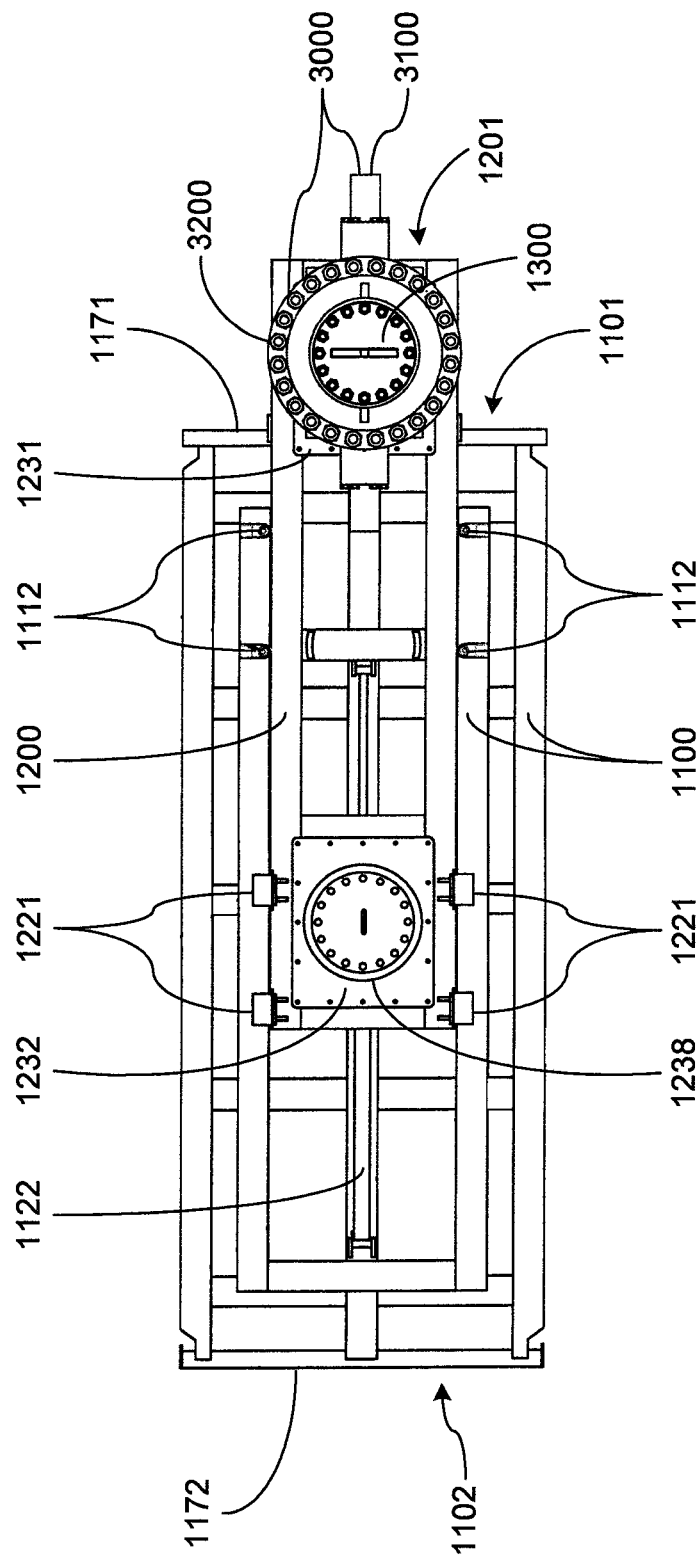
FIG. 3B is an elevational view thereof, from above.
Figure 3C:
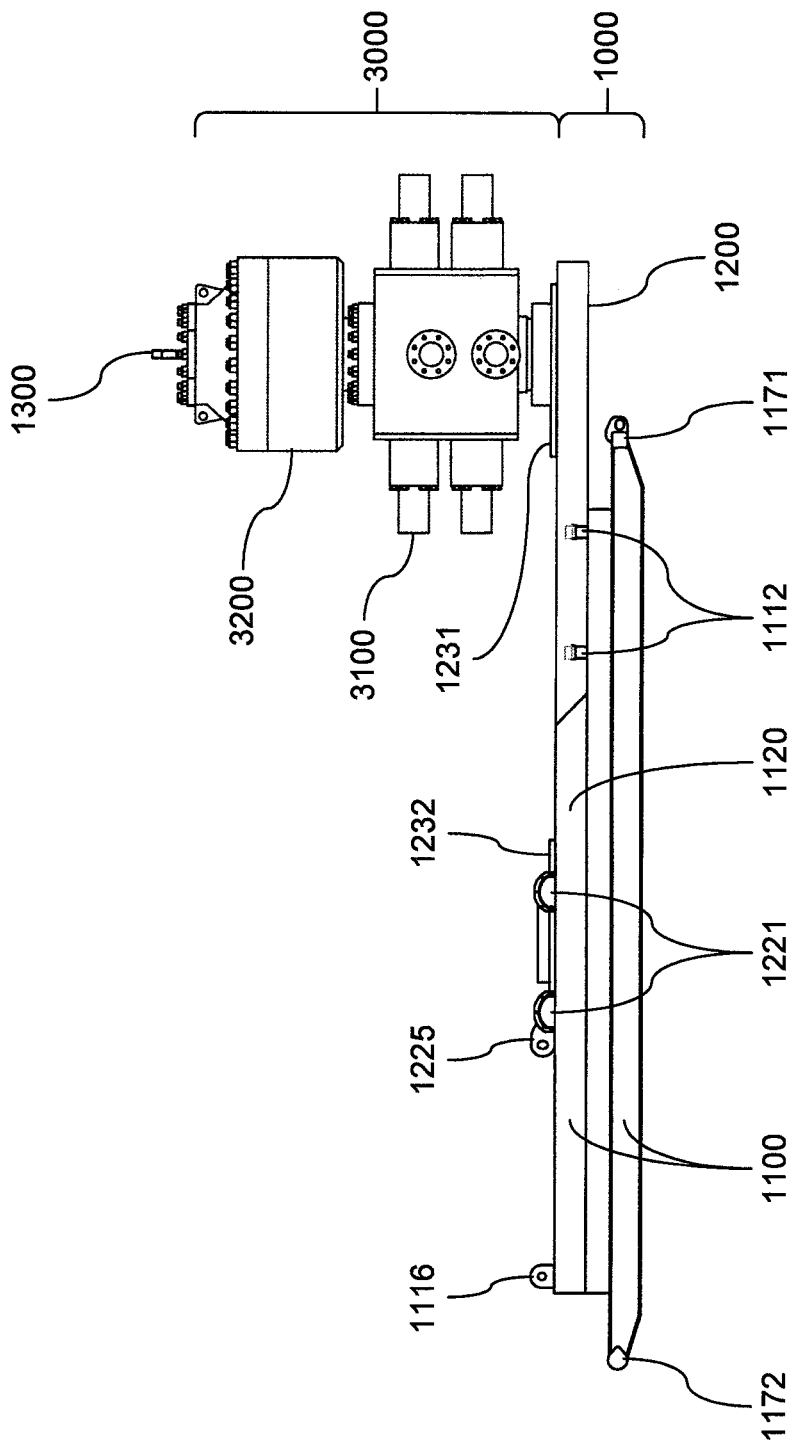
FIG. 3C is a side elevational view thereof.

FIGS. 3A through 3C, taken together, depict aspects of using the skid assembly 1000 to install a fully assembled BOP, such as the BOP assembly 3000 in a fully assembled state, onto a well head at a well site or to remove such a fully assembled BOP from such a well head. More specifically, the BOP assembly 3000, in its fully assembled state, may be supported atop a support plate located at the end 1201 of the elongate rectangular shape of the slide assembly 1200 that may be extended beyond the end 1101 of the elongate rectangular shape of the base assembly 1100 to extend over a well head located within a cellar of a well site, beneath the slide assembly 1200. Again, the hydraulic cylinder 1122 may be operated using an external hydraulic pumping system (not shown) to cause both retraction of the slide assembly 1200 relative to the base assembly 1100, as well as the depicted extension of the slide assembly 1200 relative to the base assembly 1100.

FIG. 3C, in conjunction with FIG. 2C, depicts a pair of eyelets that may be used to lock the slide assembly 1200 in its retracted position relative to the base assembly 1110 at times when it is not deemed desirable for the slide assembly 1200 to be allowed to move to an extended position, such as when the skid assembly is being transported or is used to transport at least one or more components of a BOP, such as the BOP assembly 3000. More specifically, a portion of the upper surface 1103 defined by the U-shaped guide 1120 of the base assembly 1100 may carry an eyelet 1116, and a portion of the upper surface 1104 of the slide assembly may carry a corresponding eyelet 1225. As depicted in FIG. 2C, when the slide assembly 1200 is moved to its retracted position, the eyelets 1116 and 1225 may become positioned adjacent to each other such holes defined by each become aligned, thereby enabling the depicted locking pin 1118 (or other suitable pin, bolt, rod, etc.) to be inserted through both of those holes to lock the slide assembly 1200 into its retracted position. However, as depicted in FIG. 3C, with the such a locking pin 1118 removed from those aligned holes, the slide assembly 1200 is able to be moved out of its retracted position and into an extended position such that the eyelets 1116 and 1225 are no longer positioned adjacent to each other.

FIGS. 4A through 4D, taken together, depict aspects of using the skid assembly 1000 to install a fully assembled BOP, such as the BOP assembly 3000 in a fully assembled state, onto a well head at a well site or to remove such a fully assembled BOP from such a well head. More specifically, in preparation for either the installation of the example BOP assembly 3000 onto the well head 5300 within the cellar 5100 of a well site 5000 or the removal of the example BOP assembly 3000 therefrom, the skid assembly 1000 may first be positioned on a flat ground surface adjacent an edge of the cellar 5100 that may be defined at the level of that ground surface by an upper portion of one of the concrete walls thereof. Also as part of such preparations, one or more counter-balancing weights 1400 may be placed on a portion of the end 1102 of the base assembly 1100 that is opposite the end 1101 of the base assembly 1100 that the end 1201 of the slide assembly 1200 extends beyond when the slide assembly 1200 is moved horizontally to an extended position to extend over the cellar 5100. Further, as part of such preparations, a lifting flange 1300 may be installed atop the highest component of the BOP assembly 3000 (which may be the annular BOP 3200, as depicted) and/or a lifting wishbone 1500 may be connected to the derrick hoist 5500 of a drilling rig.

Figure 4A:
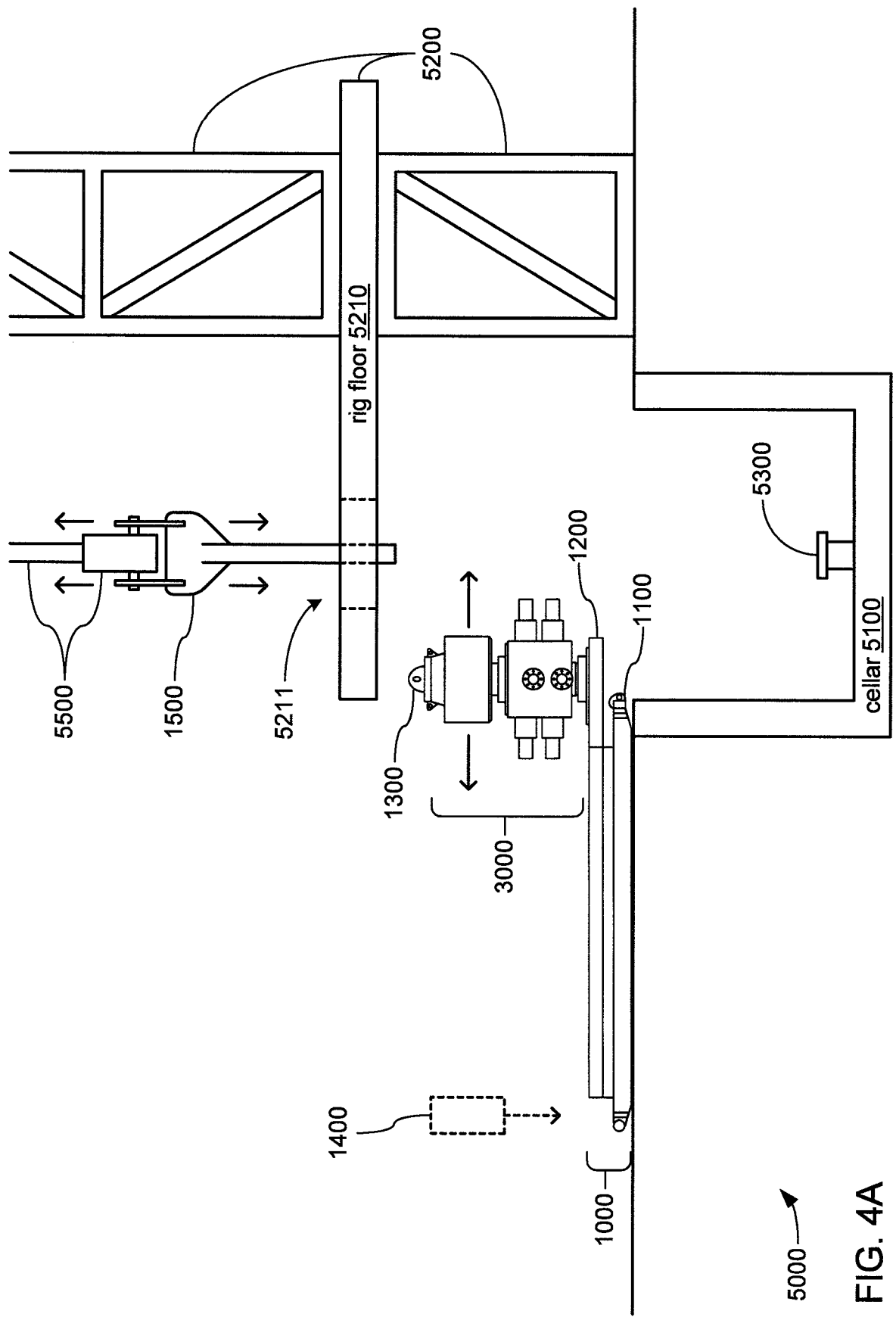
FIG. 4A is a side elevational view of a drill site at which the skid assembly of FIG. 3A has been positioned with the upper component thereof moved to an extended position relative to the lower component thereof as part of effecting the installation of an assembled BOP onto a well head of the well site or as part of effecting the removal of the assembled BOP therefrom.
Figure 4B:
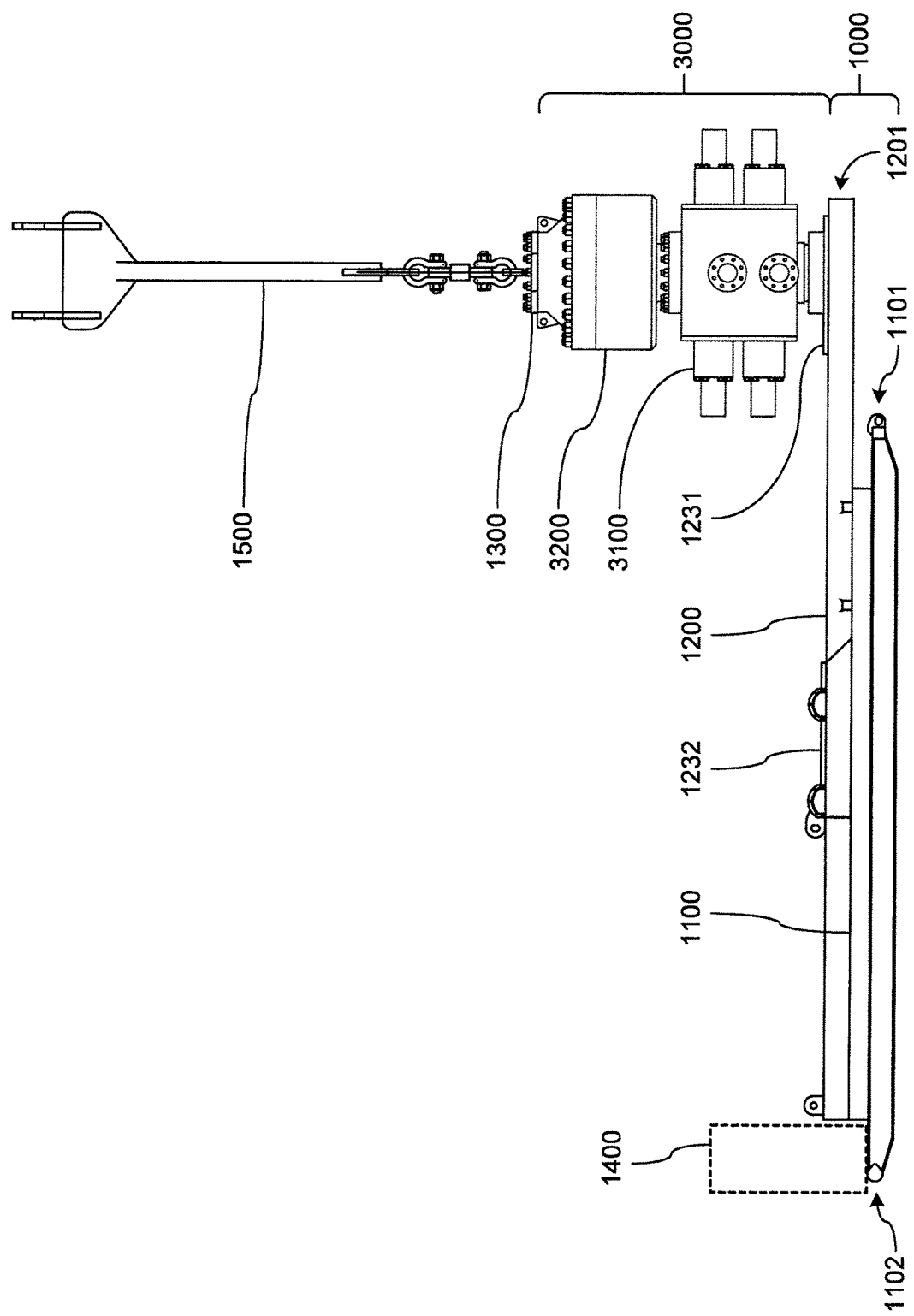
FIG. 4B is a closer side elevational view of thereof showing aspects of the use of components of a drilling rig of the well site to lower the assembled BOP onto the well head or to lift the assembled BOP away therefrom.

Referring more specifically to the installation flowchart 7100 of FIG. 4C, as well as more generally to FIGS. 4A-B, where the example BOP assembly 3000 is to be installed onto the well head 5300, with the slide assembly 1200 still retracted to its retracted position, the components of the BOP assembly 3000 may be assembled together atop the support plate 1231 positioned at the end 1201 of the slide assembly 1200 that is to be moved to extend over the cellar 5100 and directly above the well head 5300. At 7110, With the BOP assembly 3000 so assembled, the slide assembly 1200 may then be extended from the base assembly 1100 to move the BOP assembly 3000 through the limited vertical clearance between a portion of the cellar 5100 (e.g., an upper edge of a wall of the cellar 5100) and a portion of the underside of the rig floor 5210 of the drilling rig structure 5200 to cause the BOP assembly 3000 to be positioned directly above the well head 5300. At 7120, the derrick hoist 5500 may then be operated to lower the lifting wishbone 1500 through a rig floor aperture 1521 formed through the rig floor 5210 to a position adjacent to the lifting flange 1300 to enable the lifting wishbone 1500 to be connected to the lifting flange 1300 by any of a variety of connecting components, including and not limited to cables, pins, hooks, clevises, etc. At 7130, with the lifting wishbone 1500 and the lifting flange 1300 so connected, the derrick hoist 5500 may then be operated to lift the BOP assembly 3000 off of the slide assembly 1200, at least to the extent needed to allow the slide assembly 1200 to be retracted at 7140. At 7150, with the slide assembly 1200 no longer extending between the now suspended BOP assembly 3000 and the well head 5300, the derrick hoist 5500 may then be operated to lower the BOP assembly 3000 down onto the well head 5300 for connection thereto by personnel within the cellar 5100.

Figure 4D:
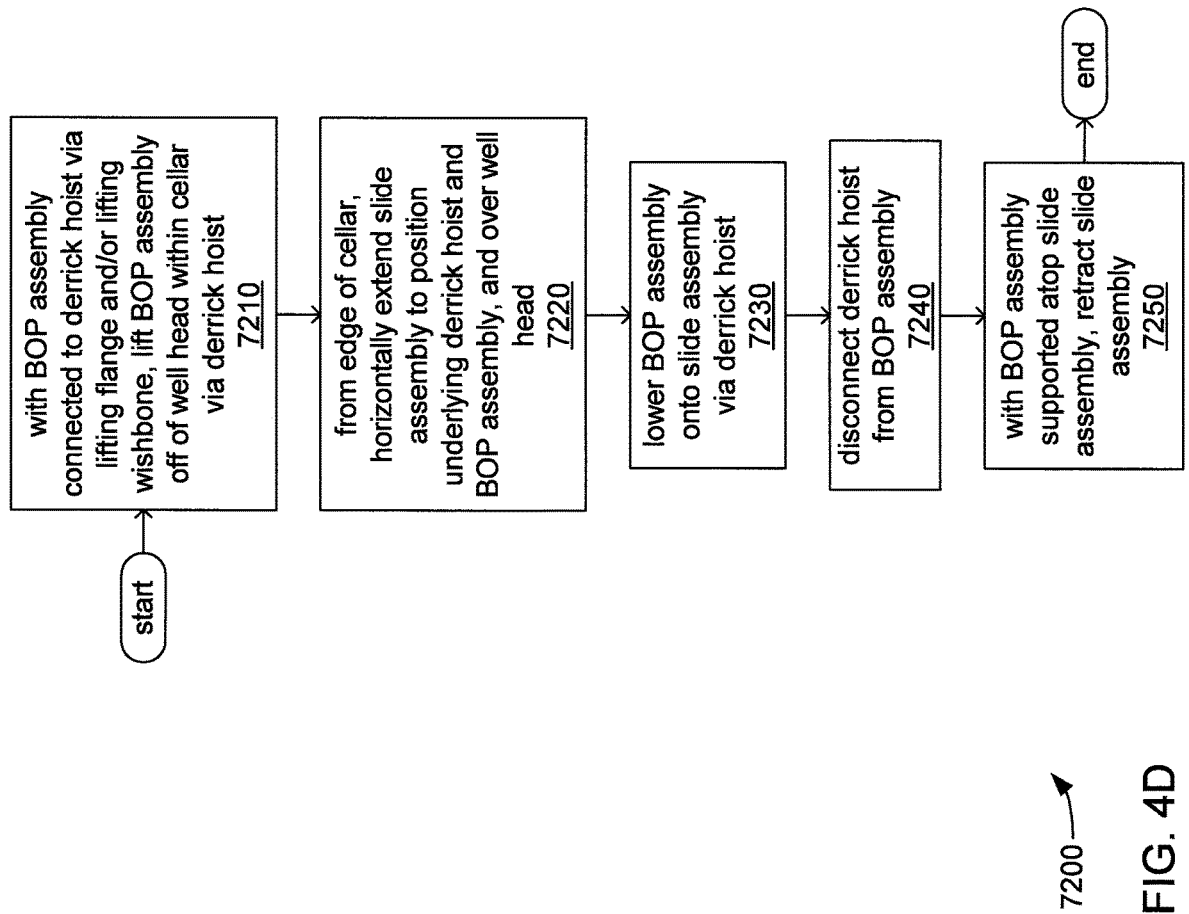
FIG. 4D is a flow chart of an embodiment of a procedure for using the skid assembly of FIG. 1A to remove an assembled BOP from a well head of a well site.

Referring more specifically to the installation flowchart 7200 of FIG. 4D, as well as more generally to FIGS. 4A-B, where the example BOP assembly 3000 is to be removed from the well head 5300, the derrick hoist 5500 may be operated to lower the lifting wishbone 1500 through the rig floor aperture 5211 to a position adjacent to the lifting flange 1300 to enable the lifting wishbone 1500 to be connected to the lifting flange 1300 by any of a variety of connecting components, including and not limited to cables, pins, hooks, clevises, etc. At 7210, with the lifting wishbone 1500 and the lifting flange 1300 so connected, and with the BOP assembly 3000 disconnected by personnel within the cellar 5100 from the well head 5300, the derrick hoist 5500 may then be operated to lift the BOP assembly 3000 off of the well head 5300, at least to the extent needed for the lowest portion of the BOP assembly 3000 to clear the slide assembly 1200, when the slide assembly 1200 is extended from the base assembly 1100 and to a position under the BOP assembly 3000. At 7220, with BOP assembly 3000 so lifted, the slide assembly 1200 may then be so extended so as to extend underneath the BOP assembly 3000 such that a portion of the slide assembly 1200 is now between the BOP assembly 3000 and the well head 5300. At 7230, with the slide assembly 1200 so extended, the derrick hoist 5500 may then be operated to lower the BOP assembly 3000 onto the support plate 1231 positioned at the end 1201 of the slide assembly 1200. At 7240, the lifting flange 1300 and the lifting wishbone 1500 may be disconnected from each other to thereby disconnect the derrick hoist 5500 from the BOP assembly 3000. At 7250, with the BOP assembly 3000 now supported on the support plate 1231 on the end 1201 of the slide assembly 1200, and fully disconnected from the derrick hoist 5500, the slide assembly 1200 may then be retracted back toward the base assembly 1100 to move the BOP assembly 3000 horizontally out of the limited vertical space between the cellar 5100 and the rig floor 5210, and to a position above the end 1101 of the base assembly 1100.

The invention claimed is:
1. A skid assembly comprising:
   a base assembly of elongate and generally flat rectangular shape, the base assembly comprising:
   a first end;
   a second end; and a flat support surface defining at least a portion of a bottom of the base assembly to enable the skid assembly to be slided onto and off of a flat bed of a vehicle for transport, and to enable the skid assembly to be dragged over a ground surface to and from a position adjacent an edge of a cellar of a well site;

a slide assembly of elongate and generally flat rectangular shape that at least partially overlies the base assembly in a stacked manner in which the elongate shapes of the base and slide assemblies extend in parallel, the slide assembly comprising:
   a first end atop which a first support station is supported to support a first component of a blowout preventer (BOP) when the BOP is in either an assembled state or a disassembled state; and
   a second end atop which a second support station is supported to support a second component of the BOP when the BOP is in the disassembled state; and multiple rollers to guide the slide assembly through a horizontal movement relative to the base assembly between a retracted position in which the first end of the slide assembly overlies the first end of the base assembly and the second end of the slide assembly overlies the second end of the base assembly, and an extended position in which the first end of the slide assembly extends beyond the first end of the base assembly to an extent sufficient to position the first support station directly over a well head within the cellar with the support surface of the base assembly supported atop the ground surface adjacent the edge of the cellar;

wherein:
   the first support station comprises a first support plate providing an upwardly facing support surface to directly support a first flange of the first component of the BOP thereon, the first support plate having at least one of a first hole pattern formed therethrough that aligns with corresponding holes formed through the first flange, or a first flange-encircling collar carried thereon, to engage the first flange to enable the first component of the BOP to be retained in place atop the first support plate during transport of both the BOP and the skid assembly atop the flat bed;
   the first flange is configured to be coupled to the well head when the BOP is installed on the well head;
   the second support station comprises a second support plate providing an upwardly facing support surface to directly support a second flange of the second component of the BOP thereon, the second support plate having at least one of a second hole pattern formed therethrough that aligns with corresponding holes formed through the second flange, or a second flange-encircling collar carried thereon, to engage the second flange to enable the second component of the BOP to be retained in place atop the second support plate during transport of both the BOP and the skid assembly atop the flat bed;
   the second flange is configured to couple the second component of the BOP to the first component of the BOP when the BOP is in the assembled state;
   the provision of both the first and second support stations enables the BOP to be transported in the disassembled state to reduce an overall height of the skid assembly and BOP atop the flat bed to enable passage of the skid assembly and BOP, together, under a bridge or a sign that overhangs a road or railway;
   the ability to drag the skid assembly over the ground surface to and from the position adjacent the edge of the cellar enables the BOP to be moved horizontally in the assembled state through an area of limited height between the edge of the cellar and an underside of a rig floor that overhangs the cellar as the slide assembly is moved horizontally between the retracted and extended positions; and
   when transported in the disassembled state, the first and second components of the BOP are supported atop the first and second support stations, respectively, in orientations similar to an orientation in which the BOP is installed on the well head.

2. The skid assembly of claim 1, wherein:
the slide assembly carries a first eyelet;
the base assembly carries a second eyelet; and
the first and second eyelets are positioned adjacent to each other to cause a hole defined by the first eyelet to be aligned with a hole defined by the second when the slide assembly is moved to the retracted position to enable an elongate pin, bolt or rod to be installed therethrough to lock the slide assembly in the retracted position.

3. The skid assembly of claim 1, wherein the first component of the BOP assembly comprises a double-ram BOP and the second component of the BOP assembly comprises an annular BOP.

4. The skid assembly of claim 1, wherein at least one of the first support plate and the second support plate is exchangeable with a third support plate to provide the slide assembly with an upwardly facing support surface that defines at least a third hole pattern of multiple holes that align with corresponding holes formed through a third flange of a third component of multiple components of another BOP assembly.

5. The skid assembly of claim 1, wherein at least one of the first support plate and the second support plate comprises an eyelet to enable lifting of at least one of the first support plate and the second support plate from the slide assembly to enable exchanging with another support plate, and to enable at least one of the first component and the second component of the BOP assembly to be secured to at least one of the first support plate and the second support plate with a belt, strap, cable or chain.

6. The skid assembly of claim 1, wherein at least one of the base assembly and the slide assembly carries multiple eyelets to cooperate with at least one belt, strap, cable or chain to secure at least one component of the multiple components of the BOP assembly to at least one of the first support station and the second support station.

7. The skid assembly of claim 1, further comprising an actuator to horizontally move the slide assembly between the retracted and extended positions.

8. The skid assembly of claim 1, wherein the base assembly further comprises a hitch carried by the base assembly at one of the first end and the second end of the base assembly to enable the skid assembly to be pulled while being slided onto the flat bed, and to enable the skid assembly to be lowered while being slided off of the flat bed.

9. The skid assembly of claim 1, wherein the base assembly is configured to support a counter-balancing weight atop the second end of the base assembly to counterbalance a weight of the BOP in the assembled state supported atop the first support station of the slide assembly when the slide assembly is at the extended position to prevent tipping of the skid assembly and the BOP into the cellar.

10. The skid assembly of claim 1, wherein the base assembly comprises a U-shaped guide that extends partially about a periphery of the slide assembly to also guide the slide assembly through the horizontal movement between the retracted position and the extended position.

11. A method of installing a blowout preventer (BOP) on a well head of a well site, the method comprising:
securing a first component of the BOP by a first flange thereof atop a first support station at a first end of a slide assembly of a skid assembly;
securing a second component of the BOP by a second flange thereof atop a second support station at a second end of the slide assembly such that the BOP is in a disassembled state;
transporting the skid assembly and the BOP in the disassembled state atop a flat bed of a vehicle to the well site with the first component of the BOP secured to the first support station, with the second component of the BOP secured to the second support station, and with the slide assembly in a retracted position relative to a base assembly of the skid assembly such that the first end of the slide assembly overlies a first end of the base assembly and the second end of the slide assembly overlies a second end of the base assembly;
sliding the skid assembly off of the flat bed, and onto a ground surface;
dragging the skid assembly over the ground surface to a position adjacent an edge of a cellar of the well site;
removing the second component of the BOP from the second support station;
connecting at least the second component of the BOP to the first component of the BOP such that the BOP is in an assembled state atop the first support station with the slide assembly still in the retracted position and while the skid assembly is positioned adjacent the edge of the cellar of the well site; and
horizontally moving the slide assembly relative to the base assembly from the retracted position to an extended position in which the first end of the slide assembly extends beyond the first end of the base assembly and over the edge of the cellar to a position that causes the first support station and the BOP to be positioned directly over the well head within the cellar;
wherein:
the base assembly has an elongate and generally flat rectangular shape;
the base assembly has a flat support surface defining at least a portion of a bottom of the base assembly to enable the skid assembly to be slided onto and off of the flat bed of the vehicle for transport, and to enable the skid assembly to be dragged over the ground surface to and from the position adjacent the edge of the cellar of the well site;
the slide assembly has an elongate and generally flat rectangular shape that at least partially overlies the base assembly in a stacked manner in which the elongate shapes of the base and slide assemblies extend in parallel;
the skid assembly comprises multiple rollers to guide the slide assembly through the horizontal movement relative to the base assembly between the retracted position and the extended position;
the first support station comprises a first support plate providing an upwardly facing support surface to directly support the first flange of the first component of the BOP thereon, the first support plate having at least one of a first hole pattern formed therethrough that aligns with corresponding holes formed through the first flange, or a first flange-encircling collar carried thereon, to engage the first flange to enable the first component of the BOP to be retained in place atop the first support plate during transport of both the BOP and the skid assembly atop the flat bed;
the first flange is configured to be coupled to the well head when the BOP is installed on the well head;
the second support station comprises a second support plate providing an upwardly facing support surface to directly support the second flange of the second component of the BOP thereon, the second support plate having at least one of a second hole pattern formed therethrough that aligns with corresponding holes formed through the second flange, or a second flange-encircling collar carried thereon, to engage the second flange to enable the second component of the BOP to be retained in place atop the second support plate during transport of both the BOP and the skid assembly atop the flat bed;
the second flange is configured to couple the second component of the BOP to the first component of the BOP when the BOP is in the assembled state;
the provision of both the first and second support stations enables the BOP to be transported in the disassembled state to reduce an overall height of the skid assembly and BOP atop the flat bed to enable passage of the skid assembly and BOP, together, under a bridge or a sign that overhangs a road or railway;
the ability to drag the skid assembly over the ground surface to and from the position adjacent the edge of the cellar enables the BOP to be moved horizontally in the assembled state through an area of limited height between the edge of the cellar and an underside of a rig floor that overhangs the cellar as the slide assembly is moved horizontally between the retracted and extended positions; and
when transported in the disassembled state, the first and second components of the BOP are supported atop the first and second support stations, respectively, in orientations similar to an orientation in which the BOP is installed on the well head.

12. The method of claim 11, wherein securing the first component of the BOP assembly atop the first support station comprises aligning holes of the first flange to corresponding holes of the first hole pattern, and fastening the first flange to the first support plate via a fastener through at least one hole of the first flange and at least one corresponding hole of the first hole pattern.

13. The method of claim 11 comprising:
operating a derrick hoist of the well site to lift the BOP in its assembled state off the first support station;
horizontally moving the slide assembly back to the retracted position; and
operating the derrick hoist to lower the BOP onto the well head.

14. A method comprising:
operating a derrick hoist of a well site to lift a blowout preventer (BOP) off of a well head within a cellar of the well site, wherein the BOP comprises at least first and second components in an assembled state in which at least a first and second component are connected;
with a skid assembly positioned atop a ground surface adjacent an edge of the cellar, horizontally moving a slide assembly of the skid assembly relative to a base assembly of the skid assembly from a retracted position, in which a first end of the slide assembly overlies a first end of the base assembly and a second end of the slide assembly overlies a second end of the base assembly, to an extended position in which the first end of the slide assembly extends beyond the first end of the base assembly over the edge of the cellar to cause a first support station positioned atop and at the first end of the slide assembly to extend between the lifted BOP assembly and the well head;

operating the derrick hoist to lower the BOP assembly onto the first support station;

horizontally moving the slide assembly from the extended position to the retracted position;

securing the first component of the BOP to the first support station;

disassembling at least the first and second components of the BOP such that the BOP is in a disassembled state; and securing the second component of the BOP assembly to a second support station positioned atop and at the second end of the slide assembly;

wherein:

the base assembly has an elongate and generally flat rectangular shape;

the base assembly has a flat support surface defining at least a portion of a bottom of the base assembly to enable the skid assembly to be slided onto and off of a flat bed of a vehicle for transport, and to enable the skid assembly to be dragged over the ground surface to and from the position adjacent the edge of the cellar of the well site;

the slide assembly has an elongate and generally flat rectangular shape that at least partially overlies the base assembly in a stacked manner in which the elongate shapes of the base and slide assemblies extend in parallel;

the skid assembly comprises multiple rollers to guide the slide assembly through the horizontal movement relative to the base assembly between the retracted position and the extended position;

the first support station comprises a first support plate providing an upwardly facing support surface to directly support a first flange of the first component of the BOP thereon, the first support plate having at least one of a first hole pattern formed therethrough that aligns with corresponding holes formed through the first flange, or a first flange-encircling collar carried thereon, to engage the first flange to enable the first component of the BOP to be retained in place atop the first support plate during transport of both the BOP and the skid assembly atop the flat bed;

the first flange is configured to be coupled to the well head when the BOP is installed on the well head;

the second support station comprises a second support plate providing an upwardly facing support surface to directly support a second flange of the second component of the BOP thereon, the second support plate having at least one of a second hole pattern formed therethrough that aligns with corresponding holes formed through the second flange, or a second flange-encircling collar carried thereon, to engage the second flange to enable the second component of the BOP to be retained in place atop the second support plate during transport of both the BOP and the skid assembly atop the flat bed;

the second flange is configured to couple the second component of the BOP to the first component of the BOP when the BOP is in the assembled state;

the provision of both the first and second support stations enables the BOP to be transported in the disassembled state to reduce an overall height of the skid assembly and BOP atop the flat bed to enable passage of the skid assembly and BOP, together, under a bridge or a sign that overhangs a road or railway;

the ability to drag the skid assembly over the ground surface to and from the position adjacent the edge of the cellar enables the BOP to be moved horizontally in the assembled state through an area of limited height between the edge of the cellar and an underside of a rig floor that overhangs the cellar as the slide assembly is moved horizontally between the retracted and extended positions; and when transported in the disassembled state, the first and second components of the BOP are supported atop the first and second support stations, respectively, in orientations similar to an orientation in which the BOP is installed on the well head.

15. The method of claim 14, wherein securing the first component of the BOP assembly atop the first support station comprises aligning holes of the first flange to corresponding holes of the first hole pattern, and fastening the first flange to the first support plate via a fastener through at least one hole of the first flange and at least one corresponding hole of the first hole pattern.

16. The method of claim 14, comprising, while the slide assembly is in the retracted position:

operating a winch of the vehicle to lift the skid assembly onto the flat bed; and transporting the skid assembly from the well site atop the flat bed with the first component of the BOP secured to the first support station and the second component of the BOP secured to the second support station.

* * * * *